(12) United States Patent
Nishimoto et al.

(10) Patent No.: US 12,250,057 B2
(45) Date of Patent: Mar. 11, 2025

(54) WIRELESS RELAY STATION, WIRELESS RELAY SYSTEM, CONTROL CIRCUIT, STORAGE MEDIUM, AND WIRELESS RELAY METHOD

(71) Applicant: Mitsubishi Electric Corporation, Tokyo (JP)

(72) Inventors: Hiroshi Nishimoto, Tokyo (JP); Yasunori Kato, Tokyo (JP); Manabu Sakai, Tokyo (JP); Kenichiro Kamohara, Tokyo (JP); Hiroyasu Sano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 440 days.

(21) Appl. No.: 17/857,848

(22) Filed: Jul. 5, 2022

(65) Prior Publication Data

US 2022/0345201 A1 Oct. 27, 2022

Related U.S. Application Data

(63) Continuation of application No. PCT/JP2020/012737, filed on Mar. 23, 2020.

(51) Int. Cl.
*H04W 40/24* (2009.01)
*H04B 7/155* (2006.01)
*H04W 4/40* (2018.01)

(52) U.S. Cl.
CPC .......... *H04B 7/15507* (2013.01); *H04W 4/40* (2018.02); *H04W 40/248* (2013.01)

(58) Field of Classification Search
CPC . H04W 40/248; H04W 88/10; H04W 84/047; H04W 4/40; H04W 92/20;
(Continued)

(56) References Cited

U.S. PATENT DOCUMENTS 10,160,466 B1 * 12/2018 Potter ..................... B61L 27/10
11,245,617 B1 * 2/2022 Bonica ................ H04L 12/4633
(Continued)

FOREIGN PATENT DOCUMENTS

JP 5447638 B2 1/2014
JP 5778745 B2 7/2015
(Continued)

OTHER PUBLICATIONS

International Search Report (PCT/ISA/210) issued in PCT/JP2020/012737, dated Aug. 25, 2020.
(Continued)

*Primary Examiner* — Chi Ho A Lee
*Assistant Examiner* — Andrew Lee
(74) *Attorney, Agent, or Firm* — Birch, Stewart, Kolasch & Birch, LLP

(57) ABSTRACT

A wireless relay station to be included in a ladder-type wireless relay network along a moving route of a moving object includes a relay control unit that includes station identification information in the wireless relay network assigned sequentially along the moving route to each of the wireless relay stations included in the wireless relay network and deployed along the moving route, configures and updates, using a first routing table that provides an address of a destination wireless relay station, a second routing table including the address, the station identification information, and an information update time, being associated with one another, of the destination wireless relay station, and provides control to share, among the wireless relay stations included in the wireless relay network, the second routing table configured and updated by each wireless relay station; and a relay communication unit that performs wireless relay communication with other wireless relay stations.

18 Claims, 20 Drawing Sheets

(58) Field of Classification Search
CPC ....... H04W 4/42; H04W 40/242; H04W 4/38; H04W 4/44; H04B 7/15507
See application file for complete search history.

(56) References Cited

U.S. PATENT DOCUMENTS

| | | | |
|---|---|---|---|
| 2012/0134316 A1 | 5/2012 | Seo et al. | |
| 2013/0272188 A1 | 10/2013 | Seo et al. | |
| 2015/0344050 A1* | 12/2015 | Yanai | B61L 21/04 246/3 |
| 2016/0262083 A1* | 9/2016 | Chan | H04W 8/087 |
| 2017/0013533 A1* | 1/2017 | Felemban | H04W 40/00 |
| 2017/0088046 A1* | 3/2017 | Denny | H04W 24/04 |
| 2017/0149603 A1 | 5/2017 | Kojima | |
| 2017/0187545 A1* | 6/2017 | Ogawa | B61L 15/0036 |
| 2017/0215123 A1* | 7/2017 | Miranda d'Orey | H04W 4/44 |
| 2017/0341653 A1* | 11/2017 | Kubota | B60W 50/0097 |
| 2018/0270721 A1* | 9/2018 | Cui | H04W 36/0011 |
| 2021/0125507 A1* | 4/2021 | Haider | G08G 5/0034 |
| 2022/0201587 A1* | 6/2022 | Edmondson | B61L 15/0054 |
| 2022/0286938 A1* | 9/2022 | Wang | H04W 40/22 |

FOREIGN PATENT DOCUMENTS

| | | |
|---|---|---|
| JP | 6606484 B2 | 10/2019 |
| WO | WO 2015/177992 A1 | 11/2015 |

OTHER PUBLICATIONS

Written Opinion of the International Searching Authority (PCT/ISA/237) issued in PCT/JP2020/012737, dated Aug. 25, 2020.
European Communication pursuant to Article 94(3) EPC for European Application No. 20926919.0, dated Sep. 13, 2023.
Chinese Office Action and Search Report for Chinese Application No. 202080098545.4, dated Jun. 11, 2024, with English translation.
Extended European Search Report mailed Feb. 22, 2023 issued in European Application No. 20926919.0.
Jiann-Liang Chen et al. "Adaptive routing protocol for reliable wireless sensor networking", Advanced Communication Technology, Feb. 7, 2010, 12th International Conference, IEEE, pp. 358-363.
Tolani Manoj, et al. "Two-Layer Optimized Railway Monitoring System Using Wi-Fi and ZigBee Interfaced Wireless Sensor Network" IEEE Sensors Journal, vol. 17, No. 7, Apr. 1, 2017 pp. 2241-2248.
Wang Anbao et al: "Realize localization in routing table in wireless networks", Computer Science and Network Technology, 2012 2nd Intl Conf on., IEEE, Dec. 29, 2012, pp. 1471-1474.
Zhao Junhui et al."A Dual-Link Soft Handover Scheme for C/U Plane Split Network in High-Speed Railway", IEEE Access, vol. 6, Mar. 19, 2018, pp. 12473-12482.

\* cited by examiner

FIG.4

| # | DESTINATION IP ADDRESS | NEXT HOP | I/F |
|---|---|---|---|
| 1 | 192.168.0.189 | DIRECT CONNECTION | PC5 |
| 2 | 192.168.0.23 | DIRECT CONNECTION | PC5 |
| 3 | 192.168.0.45 | DIRECT CONNECTION | PC5 |
| 4 | 192.168.0.106 | DIRECT CONNECTION | PC5 |
| 5 | 192.168.0.237 | 192.168.0.23 | PC5 |
| 6 | 127.0.0.1 | -(LOCAL STATION) | lo |
| 7 | 192.168.0.100 | -(LOCAL STATION) | PC5 |

FIG.6

| # | DESTINATION IP ADDRESS | NEXT HOP | I/F | STATION ID | UPDATE TIME |
|---|---|---|---|---|---|
| 1 | 192.168.0.189 | DIRECT CONNECTION | PC5 | TF0990 (FIXED) | YY/MM/DD hh:01:42.234 |
| 2 | 192.168.0.23 | DIRECT CONNECTION | PC5 | TF0995 (FIXED) | YY/MM/DD hh:00:57.756 |
| 3 | 192.168.0.45 | DIRECT CONNECTION | PC5 | TF1005 (FIXED) | YY/MM/DD hh:00:33.831 |
| 4 | 192.168.0.106 | DIRECT CONNECTION | PC5 | TF1010 (FIXED) | YY/MM/DD hh:01:01.036 |
| 5 | 192.168.0.237 | 192.168.0.23 | PC5 | TM8111 (MOBILE) | YY/MM/DD hh:02:12.510 |
| 6 | 127.0.0.1 | -(LOCAL STATION) | lo | TF1000 (FIXED) | YY/MM/DD hh:00:03.293 |
| 7 | 192.168.0.100 | -(LOCAL STATION) | PC5 | TF1000 (FIXED) | YY/MM/DD hh:00:03.293 |

FIG.7

| # | DESTINATION IP ADDRESS | NEXT HOP | I/F | STATION ID | UPDATE TIME |
|---|---|---|---|---|---|
| 1 | 192.168.0.189 | DIRECT CONNECTION | PC5 | TF0990 (FIXED) | YY/MM/DD hh:00:29.045 |
| 2 | 192.168.0.100 | DIRECT CONNECTION | PC5 | TF1000 (FIXED) | YY/MM/DD hh:00:57.756 |
| 3 | 192.168.0.45 | DIRECT CONNECTION | PC5 | TF1005 (FIXED) | YY/MM/DD hh:00:38.319 |
| 4 | 192.168.0.237 | DIRECT CONNECTION | PC5 | TM8111 (MOBILE) | YY/MM/DD hh:02:12.510 |
| 5 | 127.0.0.1 | -(LOCAL STATION) | lo | TF0995 (FIXED) | YY/MM/DD hh:00:05.612 |
| 6 | 192.168.0.23 | -(LOCAL STATION) | PC5 | TF0995 (FIXED) | YY/MM/DD hh:00:05.612 |

FIG.14

| # | DESTINATION IP ADDRESS | NEXT HOP | I/F | STATION ID | RECEIVED ELECTRIC FIELD STRENGTH | UPDATE TIME |
|---|---|---|---|---|---|---|
| 1 | 192.168.0.189 | DIRECT CONNECTION | PC5 | TF0990 (FIXED) | -75 dBm | hh:01:42.234 |
| 2 | 192.168.0.23 | DIRECT CONNECTION | PC5 | TF0995 (FIXED) | -70 dBm | hh:00:57.756 |
| 3 | 192.168.0.45 | DIRECT CONNECTION | PC5 | TF1005 (FIXED) | -68 dBm | hh:00:33.831 |
| 4 | 192.168.0.106 | DIRECT CONNECTION | PC5 | TF1010 (FIXED) | -74 dBm | hh:01:01.036 |
| 5 | 192.168.0.237 | 192.168.0.23 | PC5 | TM8111 (MOBILE) | - | hh:02:12.510 |
| 6 | 127.0.0.1 | -(LOCAL STATION) | lo | TF1000 (FIXED) | - | hh:00:03.293 |
| 7 | 192.168.0.100 | -(LOCAL STATION) | PC5 | TF1000 (FIXED) | - | hh:00:03.293 |

FIG.15

| # | DESTINATION IP ADDRESS | NEXT HOP | I/F | STATION ID | RECEIVED ELECTRIC FIELD STRENGTH | ESTIMATED DISTANCE | UPDATE TIME |
|---|---|---|---|---|---|---|---|
| 1 | 192.168.0.189 | DIRECT CONNECTION | PC5 | TF0990 (FIXED) | -75 dBm | 560 m | hh:01:42.234 |
| 2 | 192.168.0.23 | DIRECT CONNECTION | PC5 | TF0995 (FIXED) | -70 dBm | 320 m | hh:00:57.756 |
| 3 | 192.168.0.45 | DIRECT CONNECTION | PC5 | TF1005 (FIXED) | -68 dBm | 280 m | hh:00:33.831 |
| 4 | 192.168.0.106 | DIRECT CONNECTION | PC5 | TF1010 (FIXED) | -74 dBm | 500 m | hh:01:01.036 |
| 5 | 192.168.0.237 | 192.168.0.23 | PC5 | TM8111 (MOBILE) | - |  | hh:02:12.510 |
| 6 | 127.0.0.1 | -(LOCAL STATION) | lo | TF1000 (FIXED) | - |  | hh:00:03.293 |
| 7 | 192.168.0.100 | -(LOCAL STATION) | PC5 | TF1000 (FIXED) | - |  | hh:00:03.293 |

FIG.18

| # | DESTINATION IP ADDRESS | NEXT HOP | I/F | STATION ID | RECEIVED ELECTRIC FIELD STRENGTH | ESTIMATED DISTANCE | LOCATION ACCURACY METRIC | UPDATE TIME |
|---|---|---|---|---|---|---|---|---|
| 1 | 192.168.0.189 | DIRECT CONNECTION | PC5 | TF0990 (FIXED) | -75 dBm | 560 m | 275 | hh:01:42.234 |
| 2 | 192.168.0.23 | DIRECT CONNECTION | PC5 | TF0995 (FIXED) | -70 dBm | 318 m | 70 | hh:00:57.756 |
| 3 | 192.168.0.45 | DIRECT CONNECTION | PC5 | TF1005 (FIXED) | -68 dBm | 283 m | 68 | hh:00:33.831 |
| 4 | 192.168.0.106 | DIRECT CONNECTION | PC5 | TF1010 (FIXED) | -74 dBm | 500 m | 274 | hh:01:01.036 |
| 5 | 192.168.0.237 | 192.168.0.23 | PC5 | TM8111 (MOBILE) | - | | | hh:02:12.510 |
| 6 | 127.0.0.1 | -(LOCAL STATION) | lo | TF1000 (FIXED) | - | | | hh:00:03.293 |
| 7 | 192.168.0.100 | -(LOCAL STATION) | PC5 | TF1000 (FIXED) | - | | | hh:00:03.293 |

FIG.20

| # | DESTINATION IP ADDRESS | NEXT HOP | I/F | STATION ID | RECEIVED ELECTRIC FIELD STRENGTH | ESTIMATED DISTANCE | POSITIONING INFORMATION | LOCATION ACCURACY METRIC | UPDATE TIME |
|---|---|---|---|---|---|---|---|---|---|
| 1 | 192.168.0.189 | DIRECT CONNECTION | PC5 | TF0990 (FIXED) | -75 dBm | 560 m | - | 275 | hh:01:42.234 |
| 2 | 192.168.0.23 | DIRECT CONNECTION | PC5 | TF0995 (FIXED) | -70 dBm | 318 m | - | 70 | hh:00:57.756 |
| 3 | 192.168.0.45 | DIRECT CONNECTION | PC5 | TF1005 (FIXED) | -68 dBm | 283 m | - | 68 | hh:00:33.831 |
| 4 | 192.168.0.106 | DIRECT CONNECTION | PC5 | TF1010 (FIXED) | -74 dBm | 500 m | - | 274 | hh:01:01.036 |
| 5 | 192.168.0.237 | 192.168.0.23 | PC5 | TM8111 (MOBILE) | - | | - | - | hh:02:12.510 |
| 6 | 127.0.0.1 | -(LOCAL STATION) | lo | TF1000 (FIXED) | - | | <lng, lat> | 1 | hh:00:03.293 |
| 7 | 192.168.0.100 | -(LOCAL STATION) | PC5 | TF1000 (FIXED) | - | | <lng, lat> | 1 | hh:00:03.293 |

WIRELESS RELAY STATION, WIRELESS RELAY SYSTEM, CONTROL CIRCUIT, STORAGE MEDIUM, AND WIRELESS RELAY METHOD

CROSS-REFERENCE TO RELATED APPLICATION

This application is a continuation application of International Application PCT/JP2020/012737, filed on Mar. 23, 2020, and designating the U.S., the entire contents of which are incorporated herein by reference.

BACKGROUND OF THE INVENTION

1. Field of the Invention

The present disclosure relates to a wireless relay station, a wireless relay system, a control circuit, a storage medium, and a wireless relay method for performing wireless relay communication.

2. Description of the Related Art

In railroad radio communication, there is an increasing need for higher capacity. Use of broadband communication provided by a Wi-Fi (registered trademark) system, a fifth generation mobile communication (hereinafter referred to as 5G) system, and/or the like in addition to a conventional railroad radio communication enables monitoring images, many pieces of sensor information, and the like to be shared among trains and a ground system in quasi-real-time. Use of a Wi-Fi system, a 5G system, and/or the like also enables communication between trains, between a train and a railroad device, and between a train and a terminal device carried by a crew. This enables a train-to-everything (T2X) system to be provided, in which a train is connected to everything in the railroad environment to serve as an information and communication hub. Note that while conventional railroad radio communication uses the very high frequency (VHF) band, the ultra high frequency (UHF) band, and the like, broadband communication mainly uses the super high frequency (SHF) band. A higher frequency generally results in a narrower radio wave coverage area in wireless communication, and is therefore more likely to cause a blind zone. An effective countermeasure against a blind zone is wireless relay communication.

A wireless relay system is known, which wirelessly transfers data to a destination device via multiple wireless relay stations. Wireless relay communication is also designated as relay communication, multi-hop communication, and the like. To cover a wide communication area two-dimensionally, a wireless relay network is typically assumed to have a two-dimensional mesh type topology. In contrast, when used in a neighboring area of a railroad, a highway, or the like, the wireless relay network may be constructed linearly along the moving route of a moving object. A wireless relay network, i.e., a topology, constructed in a ladder configuration to cross a railroad track, a highway, or the like is referred to as ladder-type topology.

Suitable establishment of a communication route is important in a wireless relay network to achieve a higher efficiency and a smaller delay in communication, and the like. For example, Japanese Patent No. 6606484 discloses a technology for providing route search that allows preferential selection of a highly reliable relay station with a reduced number of relays required before reaching the destination device in a situation in which a radio wave condition varies. Examples of situation in which the radio wave condition varies include a case in which a communication device is installed on a moving object such as a train, that is, a case in which a mobile station exists.

A two-dimensional mesh type wireless relay network is constructed to cause the relay stations included in the wireless relay network to cover the area two-dimensionally. It is thus difficult for each of the relay stations to know the geographical location relationship with a nearby relay station. Moreover, when there is a mobile station, the relay station located near the mobile station, i.e., the relay station that communicates with the mobile station, changes to another over time, thereby making it also difficult to know the location relationship between each relay station and the moving route, as well as the geographical location relationship between relay stations. It is accordingly difficult to predict which relay station will become the relay station near the mobile station. As such, it cannot be predicted at which location and at which time communication route switching processing is to take place while a mobile station travels through relay stations. This results in ad hoc communication route switching processing, which presents a problem in a decrease in wireless communication quality.

SUMMARY OF THE INVENTION

In order to solve the above problem and achieve the object, the present disclosure is a wireless relay station to be included in a ladder-type wireless relay network along a moving route of a moving object. The wireless relay station includes: a relay control unit to include station identification information in the wireless relay network that is assigned sequentially along the moving route to each of wireless relay stations included in the wireless relay network and deployed along the moving route, to configure and update, using a first routing table that provides an address of a destination wireless relay station, a second routing table including the address, the station identification information, and an information update time, being associated with one another, of the destination wireless relay station, and to provide control to share, among the wireless relay stations included in the wireless relay network, the second routing table configured and updated by each of the wireless relay stations; and a relay communication unit to perform wireless relay communication with another one of the wireless relay stations.

BRIEF DESCRIPTION OF THE DRAWINGS

FIG. 4 is a diagram illustrating an example of a first routing table managed by each of the wireless relay stations according to the first embodiment;

FIG. 6 is a first diagram illustrating an example of a second routing table managed by each of the wireless relay stations according to the first embodiment;

FIG. 7 is a second diagram illustrating an example of the second routing table managed by each of the wireless relay stations according to the first embodiment;

FIG. 14 is a first diagram illustrating an example of the second routing table managed by a wireless relay station according to a third embodiment;

FIG. 15 is a second diagram illustrating an example of the second routing table managed by a wireless relay station according to the third embodiment;

FIG. 18 is a diagram illustrating an example of the second routing table managed by a wireless relay station according to the fourth embodiment;

FIG. 20 is a diagram illustrating an example of the second routing table managed by the wireless relay station according to the fifth embodiment;

DETAILED DESCRIPTION OF THE PREFERRED EMBODIMENTS

A wireless relay station, a wireless relay system, a control circuit, a storage medium, and a wireless relay method according to embodiments of the present disclosure will be described in detail below with reference to the drawings.

First Embodiment

Figure 1:
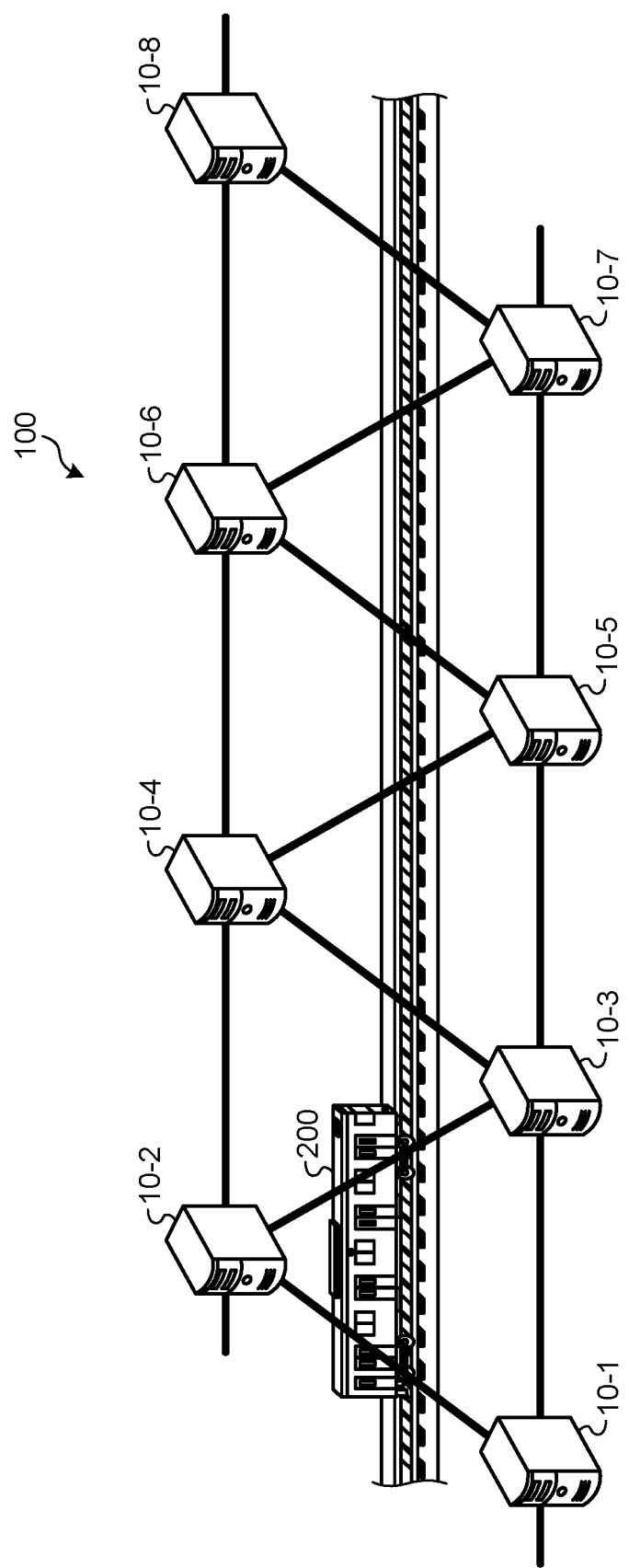
FIG. 1 is a first diagram illustrating an example configuration of a wireless relay system including multiple wireless relay stations according to a first embodiment.

FIG. 1 is a first diagram illustrating an example configuration of a wireless relay system 100 including multiple wireless relay stations according to a first embodiment. The wireless relay system 100 includes wireless relay stations 10-1 to 10-8 and a wireless relay station (not illustrated) installed on a moving object 200. The wireless relay system 100 is a system in which wireless relay communication is performed between the wireless relay stations 10-1 to 10-8 and the wireless relay station installed on the moving object 200. The moving object 200 is, for example, a train running on a track, which is a moving route; an automobile running on a highway, which is a moving route; or the like. As illustrated in FIG. 1, the present embodiment will be described with respect to an example in which the moving object 200 is a train running on a track, which is a moving route. This situation also applies to the next and subsequent embodiments. The wireless relay system 100 is a ladder-type wireless relay network constructed such that the wireless relay stations 10-1 to 10-8 are deployed around the moving route of the moving object 200, that is, deployed in a ladder form along the track on which the train runs to cross the track. The wireless relay stations 10-1 to 10-8 and the wireless relay station installed on the moving object 200 together form a ladder-type wireless relay network along the moving route of the moving object 200.

Figure 2:
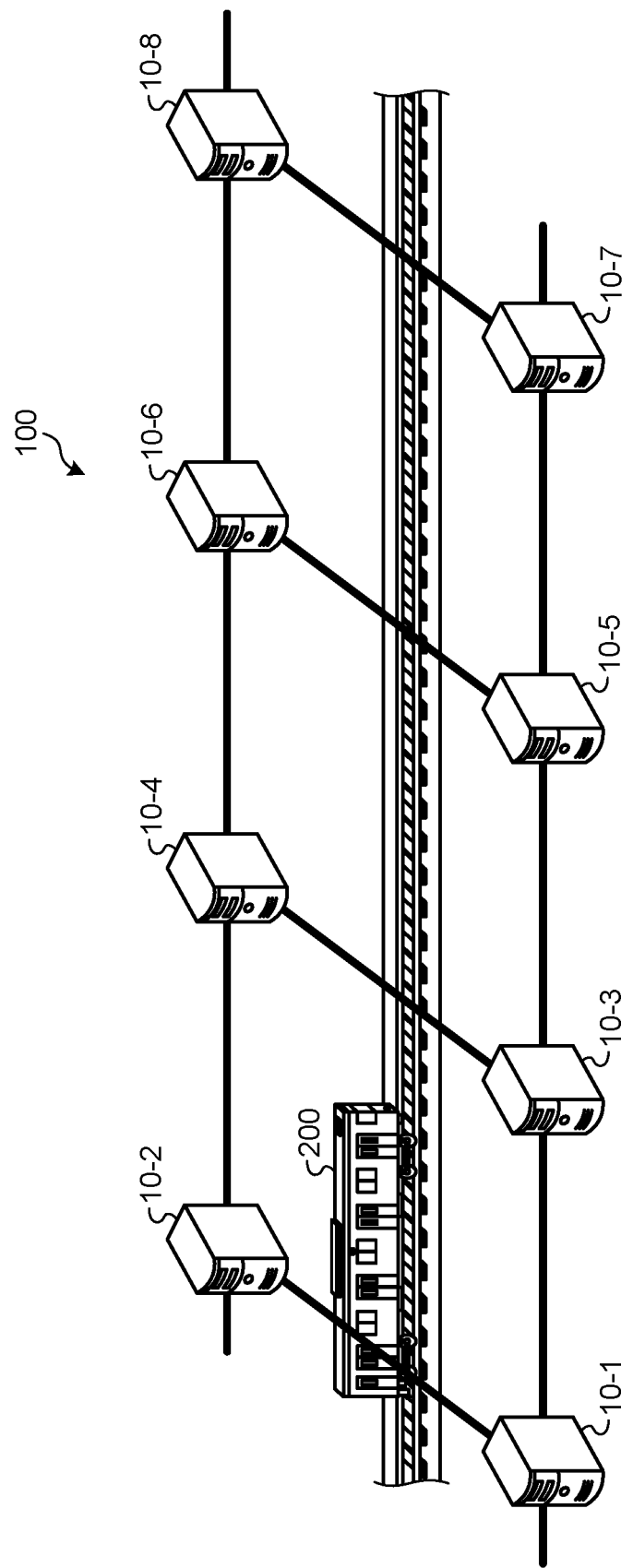
FIG. 2 is a second diagram illustrating an example configuration of the wireless relay system including multiple wireless relay stations according to the first embodiment.

In the example of FIG. 1, for example, the wireless relay station 10-3 is connected to the wireless relay stations 10-1, 10-2, 10-4, and 10-5. Note that the wireless relay stations 10-1 to 10-8 may be connected to one another in another connection topology depending on the configuration of the wireless relay system 100. FIG. 2 is a second diagram illustrating an example configuration of the wireless relay system 100 including multiple wireless relay stations according to the first embodiment. In the wireless relay system 100 illustrated in FIG. 2, the wireless relay station 10-3 is connected to the wireless relay stations 10-1, 10-4, and 10-5. Note that the configuration of the wireless relay system 100 is not limited to those of the examples of FIGS. 1 and 2. In the following description, the wireless relay stations 10-1 to 10-8 and the wireless relay station installed on the moving object 200 will be referred to as wireless relay station 10 when no distinction is made. That is, the wireless relay system 100 includes two or more wireless relay stations 10.

In the following description, the simple term of "relay station" refers to any one of the wireless relay stations 10 that is fixedly located on the ground, and the term "mobile station" refers to one of the wireless relay stations 10 that is installed on the moving object 200 to move on the moving route. A relay station is an immobile one of the wireless relay stations 10, while a mobile station is one of the wireless relay stations 10 that moves on the moving route. The present embodiment assumes that a relay station and a mobile station each include similar components. That is, a relay station and a mobile station each have an extended routing table described later, and, for example, configure, update, and distribute the extended routing table. The present embodiment assumes a case in which the wireless relay network is constructed linearly, and the wireless relay network includes a mobile station.

Figure 3:
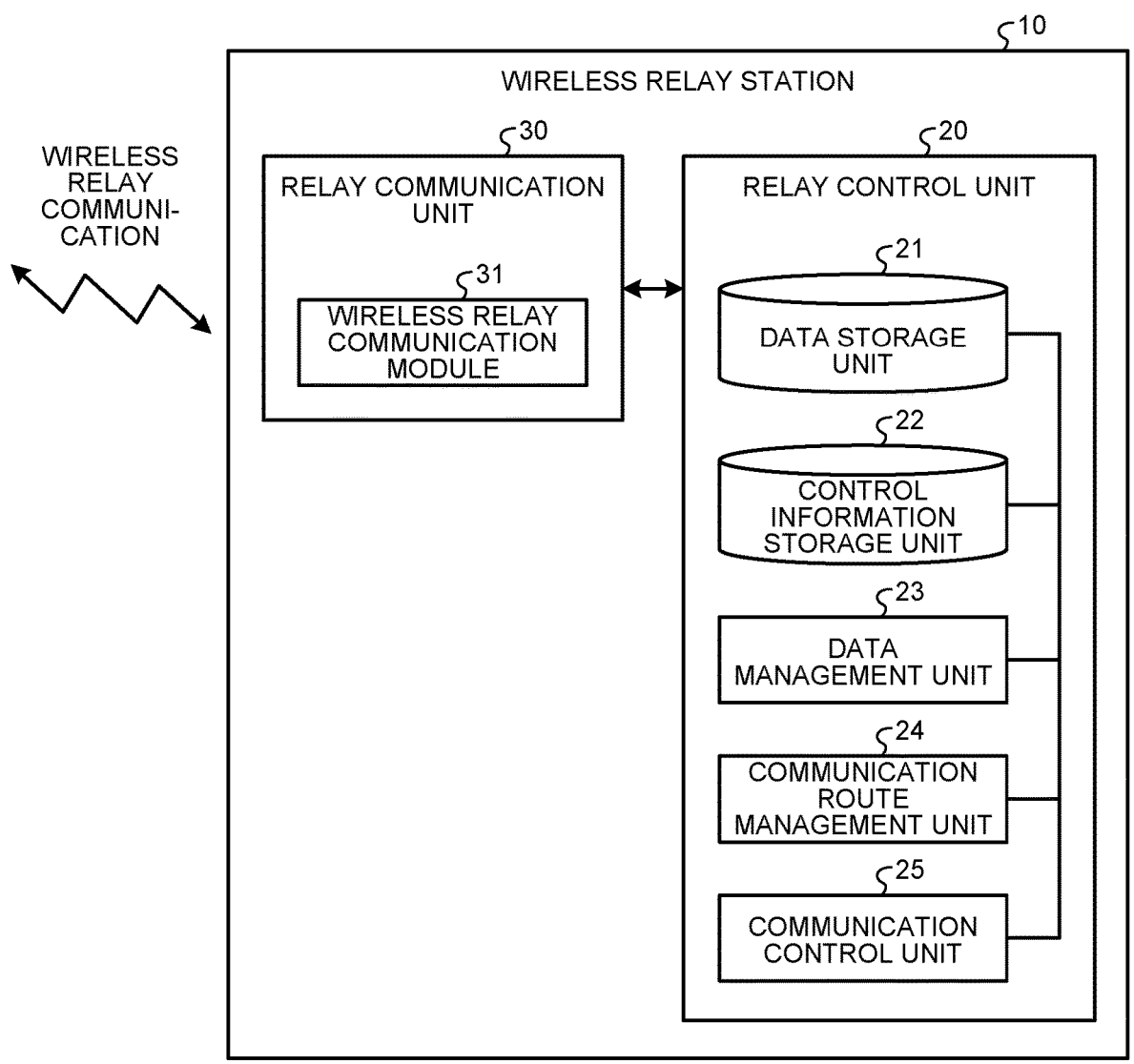
FIG. 3 is a block diagram illustrating an example configuration of each of the wireless relay stations according to the first embodiment.

A configuration of the wireless relay station 10 will next be described. FIG. 3 is a block diagram illustrating an example configuration of the wireless relay station 10 according to the first embodiment. The wireless relay station 10 includes a relay control unit 20 and a relay communication unit 30. Although the wireless relay station 10 may include another functional block or the like, the following description primarily covers functional blocks relating to communication for convenience of illustration. The relay control unit 20 includes a data storage unit 21, a control information storage unit 22, a data management unit 23, a communication route management unit 24, and a communication control unit 25. The relay communication unit 30 includes a wireless relay communication module 31. In the present embodiment, the wireless relay station 10 has a station ID, which is station identification information unique in the wireless relay system 100 and is assigned based on the geographical location relationship and on properties of that wireless relay station. The wireless relay stations 10 are each given a station ID that allows distinction between a relay station and a mobile station. In addition, the wireless relay stations 10 that are relay stations are each given a station ID sequentially numbered along the moving route of the moving object 200.

The data storage unit 21 stores transmission and reception data in relation to wireless relay communication. The data storage unit 21 includes, for example, a main storage device and an external storage device, but the specific implementation thereof is not limited thereto. The main storage device is, for example, a buffer, a cache, or the like. The external storage device is, for example, a storage.

The control information storage unit 22 stores a routing table obtained by a common routing protocol, and also stores an extended routing table specific to the present embodiment. The following description refers to a routing table obtained by a common routing protocol as first routing table, and an extended routing table specific to the present embodiment as second routing table. The control information storage unit 22 includes, for example, a main storage device and an external storage device, but the specific implementation thereof is not limited thereto. The control information storage unit 22 also stores permanently the unique station ID assigned based on the geographical location relationship and on properties of the corresponding wireless relay station.

The data management unit 23 processes transmission and reception data, and reads data from, and writes data to, the data storage unit 21.

The communication route management unit 24 configures and updates the first routing table, and reads and writes the first routing table from and to the control information storage unit 22. The communication route management unit 24 also configures and updates the second routing table, and reads and writes the second routing table from and to the control information storage unit 22.

The communication control unit 25 instructs the relay communication unit 30 on data transmission and reception based on the latest version of the second routing table. To also share the second routing table stored in the control information storage unit 22 among the wireless relay stations 10, the communication control unit 25 instructs the relay communication unit 30 on transmission and reception as data.

The following description will primarily be provided with respect to configuring, updating, and transmitting and receiving of the second routing table, and description will thus be omitted with respect to the data storage unit 21 and to the data management unit 23, which treat standard transmission and reception data.

The wireless relay communication module 31 is a wireless interface for performing wireless relay communication with other relay stations and mobile station. Under control of the communication control unit 25, the wireless relay communication module 31 transmits and receives data, transmits and receives the first routing table, and transmits and receives the second routing table. It is suitable that the wireless relay communication module 31 support a wireless communication scheme with which terminals can communicate with each other. Examples of the wireless communication scheme to be supported by the wireless relay communication module 31 include sidelink standardized in Third Generation Partnership Project (3GPP), a wireless local area network (LAN) standardized in Institute of Electrical and Electronic Engineers (IEEE), and a low power wide area (LPWA) designed for Internet of Things (IoT), but the specific wireless communication scheme is not limited to these schemes. Note that sidelink standardized in 3GPP is a scheme for terminal-to-terminal communication, and is, for example, an interface known as PC5.

The second routing table managed by the communication route management unit 24 will next be described. The first routing table will be described first. FIG. 4 is a diagram illustrating an example of the first routing table managed by the wireless relay station 10 according to the first embodiment. The first routing table provides the internet protocol (IP) address of each of wireless relay stations 10 in the destination IP address field, and provides the connection configuration with each of other wireless relay stations 10 in the next hop field. For example, when a local station in the wireless relay network has an IP address of 192.168.0.100, and the local station has direct communication links being established with four neighboring ones of the wireless relay stations 10, the first routing table will be as illustrated in FIG. 4. In FIG. 4, the I/F field provides the name of the communication interface type, where PC5 represents a name of the sidelink interface, and lo represents a local loopback of the local station. In addition, in FIG. 4, the wireless relay stations of #1 to #4 are the wireless relay stations 10 each having a direct connection, i.e., a direct communication link, being established with the local station. In FIG. 4, the wireless relay station 10 of #5 is a wireless relay station 10 that can establish communication via the wireless relay station 10 of #2 having a destination IP address of 192.168.0.23.

Figure 5:
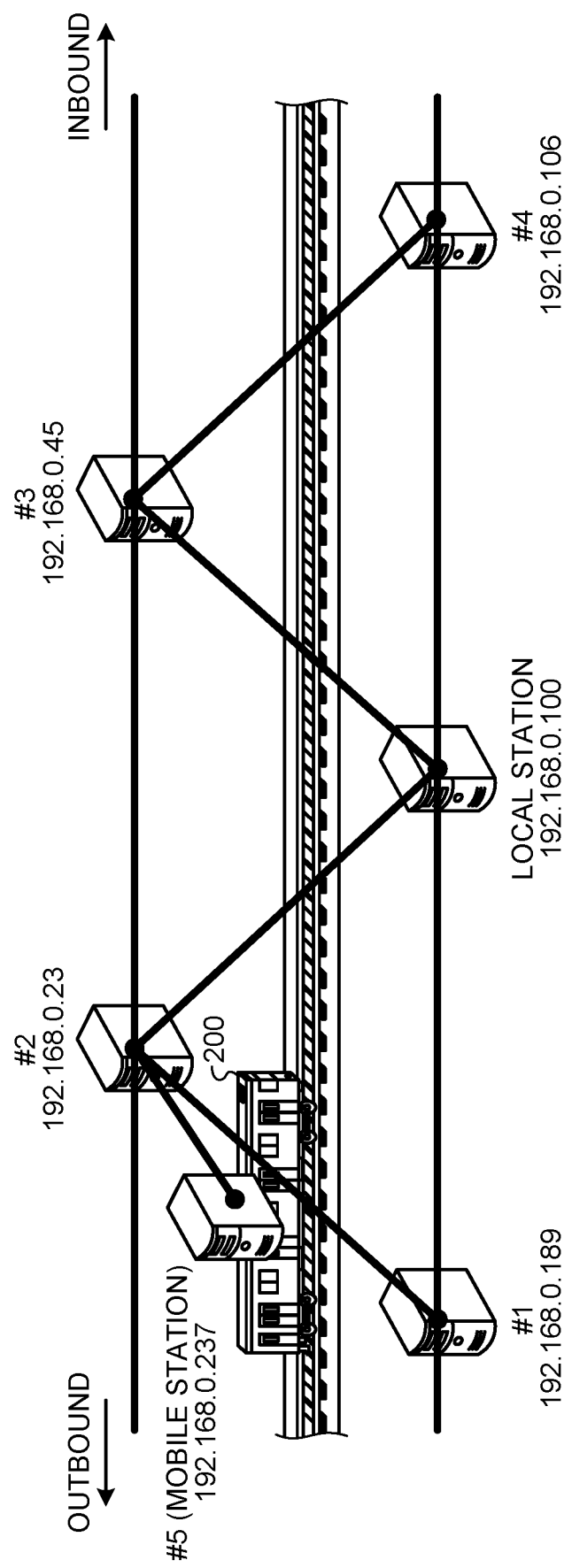
FIG. 5 is a diagram illustrating an example deployment of wireless relay stations in the wireless relay system according to the first embodiment.

Assume here that six wireless relay stations 10 including the five wireless relay stations 10 of #1 to #5 and the local station illustrated in FIG. 4 have geographical location relationships as illustrated in FIG. 5. FIG. 5 is a diagram illustrating an example deployment of the wireless relay stations 10 in the wireless relay system 100 according to the first embodiment. The IP addresses listed in the first routing table are typically assigned to these wireless relay stations 10 from the network side independently of the geographical locations thereof. This makes it difficult to know the location relationship between the local station and another wireless relay station 10 only by the IP address. In addition, as illustrated in FIG. 5, the wireless relay station 10 of #5 is in fact a mobile station, but it is difficult to know, only by the IP address, whether each wireless relay station 10 is a relay station fixedly located on the ground or a mobile station installed on the moving object 200 to move on the moving route. It is to be understood that, in FIG. 5, the wireless relay station 10 of #5, i.e., the mobile station, is actually installed inside the moving object 200. This also applies to the next and subsequent figures.

FIG. 6 is a first diagram illustrating an example of the second routing table managed by the wireless relay station 10 according to the first embodiment. The second routing table is an extended version of the first routing table. The second routing table is configured by the communication route management unit 24 based on the first routing table configured using a common routing protocol. The second routing table associates the station ID with the IP address of each corresponding one of the wireless relay stations 10, and manages the station ID together with the update time when the station ID is associated with the IP address, i.e., the time stamp. Each of the wireless relay stations 10 distributes the second routing table including the station ID of that wireless relay station, thereby enabling the station ID to be known also to other ones of the wireless relay stations 10, and to thus be shared throughout the entire wireless relay network. The station ID is assigned during installation, separately from the IP address in the wireless relay network, and is determined according to properties of the wireless relay station 10 including its location.

For simplicity of illustration, the properties of the wireless relay station 10 as used herein includes a specifier indicating the moving route such as a train line, a specifier indicating whether that wireless relay station is a relay station or a mobile station, and a number identifying the location along the moving route. The example of FIG. 6 denotes the specifier of a moving route by "T", the specifier of a relay station by "F", and the specifier of a mobile station by "M". Note that the properties to be indicated are not limited thereto, and more wireless station types may be used to indicate, for example, an installation environment such as a station or a tunnel, and to indicate whether that wireless relay station is installed on the right side or on the left side with respect to one direction of the moving route. To identify the location of a relay station, a numbering rule is herein used in which numbers are assigned in ascending order in the inbound direction, where the unidimensional moving route of the mobile station, e.g., the track in the example of FIG. 5, is defined such that one direction is the inbound direction, and the opposite direction is the outbound direction.

Giving a number "1000" to a relay station that serves as a reference relay station, the two relay stations on the inbound side are given numbers of "1005" and "1010" in ascending order from the one nearer to the reference relay station, and the two relay stations on the outbound side are given numbers of "0995" and "0990" in descending order from the one nearer to the reference relay station. This causes the station ID of the positional reference relay station to be "TF1000", and the station IDs of the other relay stations to be "TF0990", "TF0995", "TF1005", and "TF1010". On the other hand, the mobile station can be identified as a mobile station by the specifier "M", and can thus be given a number unrelated to the location. The example of FIG. 6 uses "TM8111" as the station ID of the mobile station. Note that no specific example values are displayed for the date (YY/MM/DD) and the hour (hh) in the date and time display of the time stamp in FIG. 6.

FIG. 7 is a second diagram illustrating an example of the second routing table managed by the wireless relay station 10 according to the first embodiment. FIG. 7 illustrates an example of the second routing table of the relay station having an IP address of "192.168.0.23" and a station ID of "TF0995". As described above, the wireless relay stations 10 configure and update their respective second routing tables, and exchange and share the second routing tables among the wireless relay stations 10.

Figure 8:
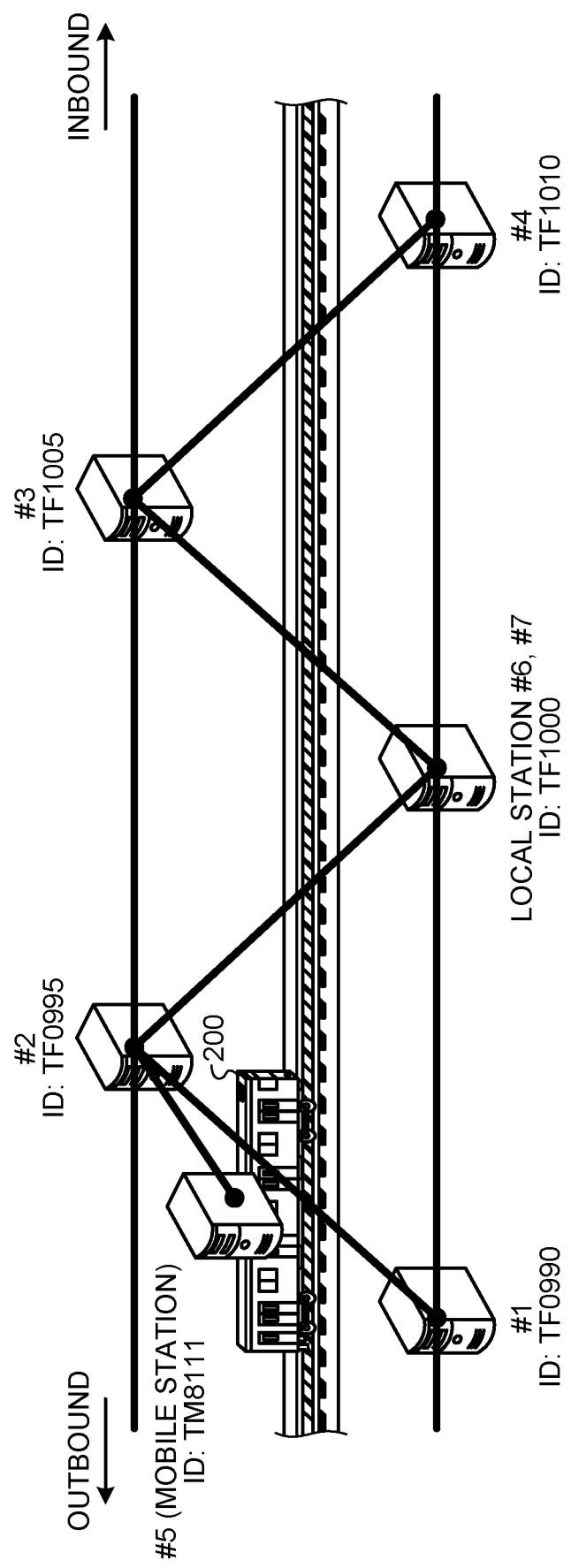
FIG. 8 is a diagram illustrating a situation in which a station identifier (ID) assigned to each of the wireless relay stations according to the first embodiment in accordance with a numbering rule established is mapped to a geographical location relationship of that wireless relay station.

FIG. 8 is a diagram illustrating a situation in which the station ID assigned to each of the wireless relay stations 10 according to the first embodiment in accordance with the numbering rule established is mapped to the geographical location relationship of that wireless relay station 10. Sharing of the second routing table having the station ID associated with each of the wireless relay stations 10 allows each of the wireless relay stations 10 to know the relative location relationships with other wireless relay stations 10 without location information such as the latitude and longitude, or the railroad kilometrage, of each of the wireless relay stations 10. Sharing of the second routing table having the station ID associated with each of the wireless relay stations 10 also allows the wireless relay stations 10 to know which relay station is currently approached by the mobile station. This enables the wireless relay stations 10 to predict at which location and at which time communication route switching processing will take place as a result of movement of the mobile station, and can thus stabilize communication quality of the mobile station in the wireless relay network.

Figure 9:
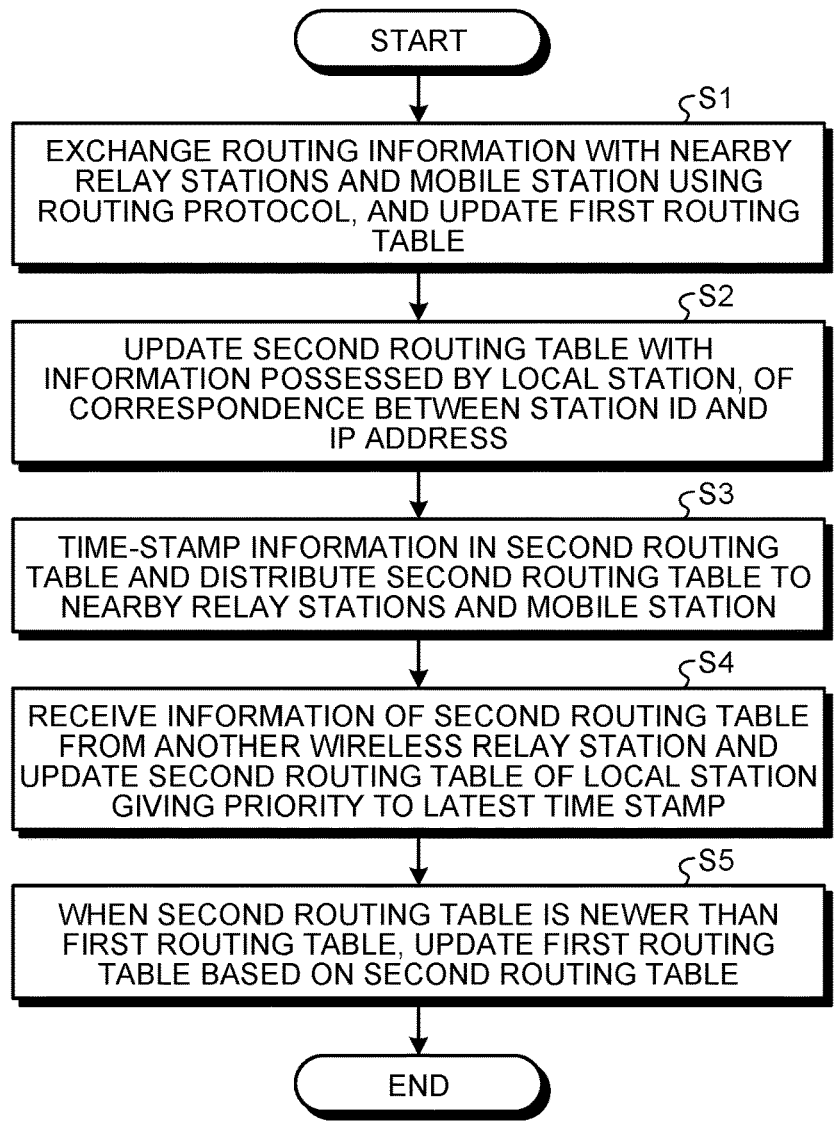
FIG. 9 is a flowchart illustrating an operation of updating the second routing table performed by each of the wireless relay stations according to the first embodiment.

FIG. 9 is a flowchart illustrating an operation of updating the second routing table performed by the wireless relay station 10 according to the first embodiment. The communication route management unit 24 exchanges routing information with nearby relay stations and mobile station using a routing protocol, and updates the first routing table (step S1). The routing protocol may be a conventional common routing protocol. The communication route management unit 24 writes the first routing table updated, into the control information storage unit 22. Note that when having no first routing table, the communication route management unit 24 generates a new first routing table. The communication route management unit 24 can exchange information with nearby relay stations and mobile station using a common routing protocol through wireless transmission performed by the relay communication unit 30 via the communication control unit 25.

The communication route management unit 24 updates the second routing table based on the first routing table. Specifically, the communication route management unit 24 updates the second routing table by reflecting the correspondence information possessed by the corresponding wireless relay station and indicating a correspondence between the station ID and the IP address of the corresponding wireless relay station and of other wireless relay stations 10 (step S2). Note that when having no second routing table, the communication route management unit 24 generates a new second routing table, and reflects only the correspondence information between the station ID and the IP address of the corresponding wireless relay station. The information of the first routing table and the second routing table including the station IDs and the IP addresses is stored in the control information storage unit 22, and thus, the communication route management unit 24 reads these pieces of information from the control information storage unit 22 to perform the processing. The communication route management unit 24 then writes the second routing table updated, into the control information storage unit 22.

The communication route management unit 24 timestamps, with the current time, the information in the latest version of the second routing table possessed by the corresponding wireless relay station, and distributes the second routing table updated to nearby relay stations and mobile station (step S3). The distribution method is desirably multicasting, but is not limited thereto, and may be broadcasting without limitation of stations for reception, or unicasting to each station individually. The communication route management unit 24 reads information in the latest version of the second routing table from the control information storage unit 22. The communication route management unit 24 can distribute the second routing table through wireless transmission performed by the relay communication unit 30 via the communication control unit 25.

The communication route management unit 24 receives information of the second routing table distributed from other wireless relay stations 10. The communication route management unit 24 compares the time stamps of the information, and updates the second routing table of the corresponding wireless relay station by giving priority to the information having the latest time stamp (step S4). The phrase "information distributed from other wireless relay stations 10" refers not only to information from neighboring relay stations and mobile station directly connected to the local station, but also to information from distant relay stations and mobile stations not directly connected to the local station. In the update operation, the communication route management unit 24 discards information older than the latest information. The communication route management unit 24 can receive information of the second routing table from other wireless relay stations 10 through wireless transmission performed by the relay communication unit 30 via the communication control unit 25. The communication route management unit 24 stores the second routing table updated, in the control information storage unit 22.

When the second routing table is newer than the first routing table, the communication route management unit 24 updates the first routing table based on the second routing table (step S5). The information in the latest version of the first routing table and the information in the latest version of the second routing table are stored in the control information storage unit 22. The communication route management unit 24 may also store information on time when the first routing table was configured or updated, in the control information storage unit 22. The communication route management unit 24 reads these pieces of information from the control information storage unit 22 to perform update operation. The communication route management unit 24 stores the first routing table updated, in the control information storage unit 22.

As described above, the relay control unit 20 of the wireless relay station 10 includes station IDs in the wireless relay network that are assigned sequentially along the moving route to the wireless relay stations 10 included in the wireless relay network and deployed along the moving route. The relay control unit 20 configures and updates, using a first routing table providing the addresses of the destination wireless relay stations 10, a second routing table including the address, the station ID, and the information update time, associated with one another, of each of the destination wireless relay stations 10. The relay control unit 20 provides control to share, among the wireless relay stations 10 included in the wireless relay network, the second routing table configured and updated by each of the wireless relay stations 10.

The wireless relay station 10 repeats the foregoing operation periodically or with transmission and/or reception of routing information using a routing protocol as a trigger. That is, the wireless relay station 10 may distribute the second routing table including station IDs upon a communication route update due to, for example, movement of the mobile station. This enables the wireless relay stations 10 to know the location relationships with one another as illustrated in FIG. 8. In addition, the wireless relay station 10 can collect not only information about neighboring wireless relays stations 10 directly connected thereto, but also information about distant wireless relay stations 10 to update the second routing table. This enables the wireless relay station 10 to infer location relationships with the relay stations and the mobile stations over the entire wireless relay network. Due to the capability of knowing the situation of which relay station is directly communicating with the mobile station, the wireless relay stations 10 can predict at which location and at which time route switching processing will take place by observation of temporal change.

A hardware configuration of the wireless relay station 10 will next be described. In the wireless relay station 10, the relay communication unit 30 is a communication device. The relay control unit 20 is implemented in processing circuitry. The processing circuitry may be a combination of a processor that executes a program stored in a memory and the memory, or may be a dedicated hardware element. Processing circuitry is also referred to as control circuit.

Figure 10:
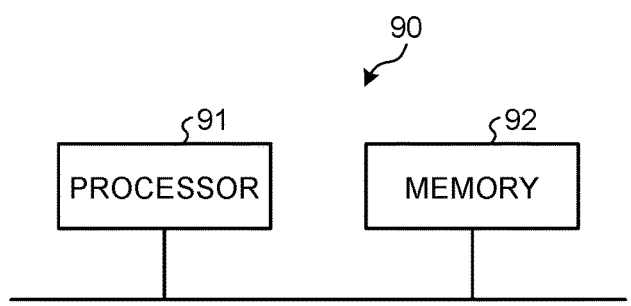
FIG. 10 is a diagram illustrating an example configuration of processing circuitry included in each of the wireless relay stations according to the first embodiment in a case in which the processing circuitry is implemented by a combination of a processor and a memory.

FIG. 10 is a diagram illustrating an example configuration of processing circuitry 90 included in the wireless relay station 10 according to the first embodiment in a case in which the processing circuitry is implemented by a combination of a processor and a memory. The processing circuitry 90 illustrated in FIG. 10 is a control circuit, and includes a processor 91 and a memory 92. In the case in which the processing circuitry 90 includes the processor 91 and the memory 92, each functionality of the processing circuitry 90 is implemented in software, firmware, or a combination of software and firmware. The software or firmware is described as a program, and is stored in the memory 92. In the processing circuitry 90, the processor 91 reads and executes the program stored in the memory 92 to implement each functionality. That is, the processing circuitry 90 includes the memory 92 for storing a program that causes the processing of the wireless relay station 10 to be performed. It can also be said that this program is a program for causing the wireless relay station 10 to perform each functionality to be provided by the processing circuitry 90. This program may be supplied through a storage medium storing the program or through another means such as a communication medium.

The foregoing program can be said to be a program that causes the wireless relay station 10 to perform a control step in which the relay control unit 20 includes station IDs in the wireless relay network that are assigned sequentially along the moving route to the wireless relay stations 10 included in the wireless relay network and deployed along the moving route, configures and updates, using a first routing table providing the addresses of destination wireless relay stations 10, a second routing table including the address, the station ID, and the information update time, associated with one another, of each of the destination wireless relay stations 10, and provides control to share, among the wireless relay stations 10 included in the wireless relay network, the second routing table configured and updated by each of the wireless relay stations 10; and a communication step in which the relay communication unit 30 performs wireless relay communication with other wireless relay stations 10.

In this regard, the processor 91 is, for example, a central processing unit (CPU), a processing unit, a computing unit, a microprocessor, a microcomputer, a digital signal processor (DSP), or the like. In addition, the memory 92 is, for example, a non-volatile or volatile semiconductor memory such as a random access memory (RAM), a read-only memory (ROM), a flash memory, an erasable programmable ROM (EPROM), an electrically erasable programmable ROM (EEPROM) (registered trademark); a magnetic disk, a flexible disk, an optical disk, a compact disc, a MiniDisc, a digital versatile disc (DVD), or the like.

Figure 11:
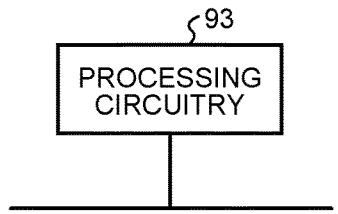
FIG. 11 is a diagram illustrating an example of the processing circuitry included in each of the wireless relay stations according to the first embodiment in a case in which the processing circuitry is implemented in a dedicated hardware element.

FIG. 11 is a diagram illustrating an example of processing circuitry 93 included in the wireless relay station 10 according to the first embodiment in a case in which the processing circuitry is implemented in a dedicated hardware element. The processing circuitry 93 illustrated in FIG. 11 is, for example, a single circuit, a set of multiple circuits, a programmed processor, a parallel programmed processor, an application specific integrated circuit (ASIC), a field programmable gate array (FPGA), or a combination thereof. The processing circuitry may be implemented partially in a dedicated hardware element, and partially in software or firmware. Thus, the processing circuitry can implement each foregoing functionality in a dedicated hardware element, software, firmware, or a combination thereof.

As described above, according to the present embodiment, a relay station included in the ladder-type wireless relay network, among the wireless relay stations 10, has a station ID unique in the wireless relay network assigned sequentially along the moving route of the mobile station. Each of the wireless relay stations 10 updates and distributes the second routing table including the station IDs as well as the IP addresses representing the destinations of that wireless relay station 10 being associated with the wireless relay stations 10, and shares the latest second routing table among the wireless relay stations 10. This configuration limits the geographical relay direction to two linear directions, thereby enabling the wireless relay stations 10 to know the location relationships with neighboring relay stations and mobile station by means of the IDs for identification, and to observe the entire wireless relay network in perspective. Due to the capability of knowing the situation of which relay station is directly communicating with the mobile station, the wireless relay stations 10 can predict at which location and at which time route switching processing will take place by observation of temporal change. This enables the wireless relay station 10 to reduce or prevent a reduction in wireless communication quality in the wireless relay network including a wireless relay station 10 that moves.

Second Embodiment

In a second embodiment, the wireless relay station further includes a component for performing wireless communication other than relay communication in addition to the components of the wireless relay station 10 of the first embodiment, and is thus capable of performing data transmission to and from outside the wireless relay network. In this regard, the phrase "wireless communication other than relay communication" refers to wireless communication using a wireless communication scheme different from that used in the wireless relay communication, or wireless communication that can use a radio frequency band, a radio spectrum, communication timing, and/or the like different from those of the wireless relay communication even when the wireless communication scheme is the same. Inclusion, inside the wireless relay network, of a wireless relay station capable of performing data transmission to and from outside the wireless relay network enables the wireless relay system 100 to transfer relayed data to outside the wireless relay network, and the wireless relay system 100 to transfer data received from outside the wireless relay network into the wireless relay network. That is, a wireless relay station of the second embodiment functions as a connection point between the inside and outside of the wireless relay network.

Figure 12:
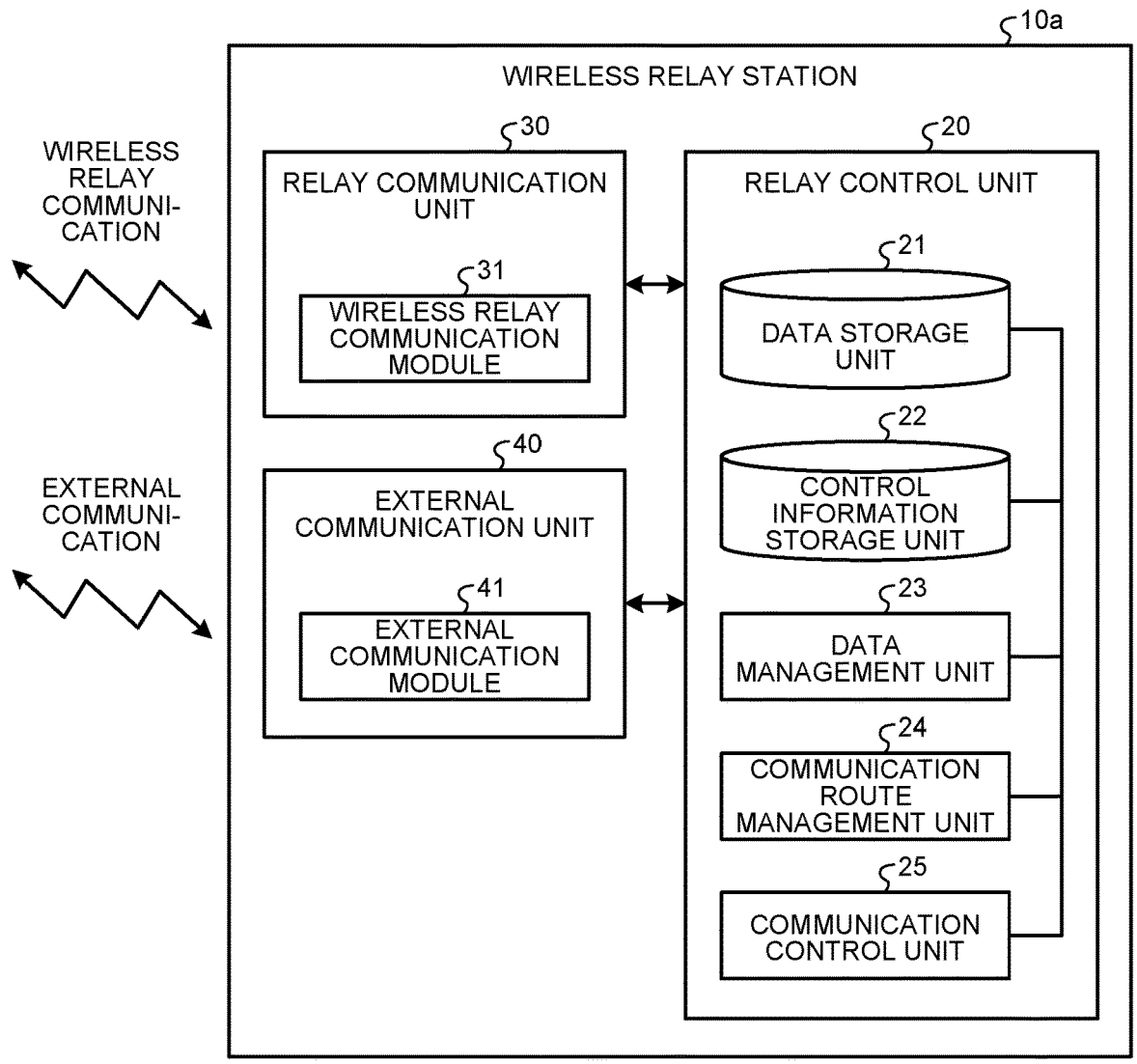
FIG. 12 is a first block diagram illustrating an example configuration of a wireless relay station according to a second embodiment.

FIG. 12 is a first block diagram illustrating an example configuration of a wireless relay station 10a according to the second embodiment. The wireless relay station 10a further includes an external communication unit 40 in addition to the components of the wireless relay station 10 of the first embodiment illustrated in FIG. 3. The external communication unit 40 includes an external communication module 41.

The external communication module 41 is a wireless interface that performs wireless communication other than the wireless relay communication with the relay stations and with the mobile stations. That is, the external communication module 41 performs wireless communication other than the wireless relay communication performed by the relay communication unit 30. The external communication module 41 may support wireless communication schemes such as, for example, Long Term Evolution (LTE) and Fifth Generation New Radio (5G NR), each of which provides a wireless communication link between a base station and a terminal, standardized in 3GPP, and provides interface functionality generally known as Uu in relation to the wireless communication scheme for cellular communication. The external communication module 41 may also support wireless communication schemes such as, for example, a wireless LAN standardized in IEEE, and a wireless metropolitan area network (MAN), typical examples of which include WiMAX. Note that the specific wireless communication schemes supported by the external communication module 41 are not limited thereto. The external communication module 41 may support a wireless communication scheme the same as any of the wireless communication schemes supported by the wireless relay communication module 31 as long as the radio frequency channel, the communication timing, and/or the like can be set to be different from those of the relay communication to prevent interference with the relay communication.

The external communication unit 40 is capable of wirelessly communicating with the outside of the wireless relay network. Transmission and reception data to and from the outside of the wireless relay network through wireless communication performed by the external communication unit 40 is managed by the data management unit 23, and stored in the data storage unit 21. In addition, communication performed by the external communication unit 40 is controlled by the communication control unit 25. The other functionalities and components of the wireless relay station 10a are similar to the corresponding functionalities and components of the wireless relay station 10 of the first embodiment.

Figure 13:
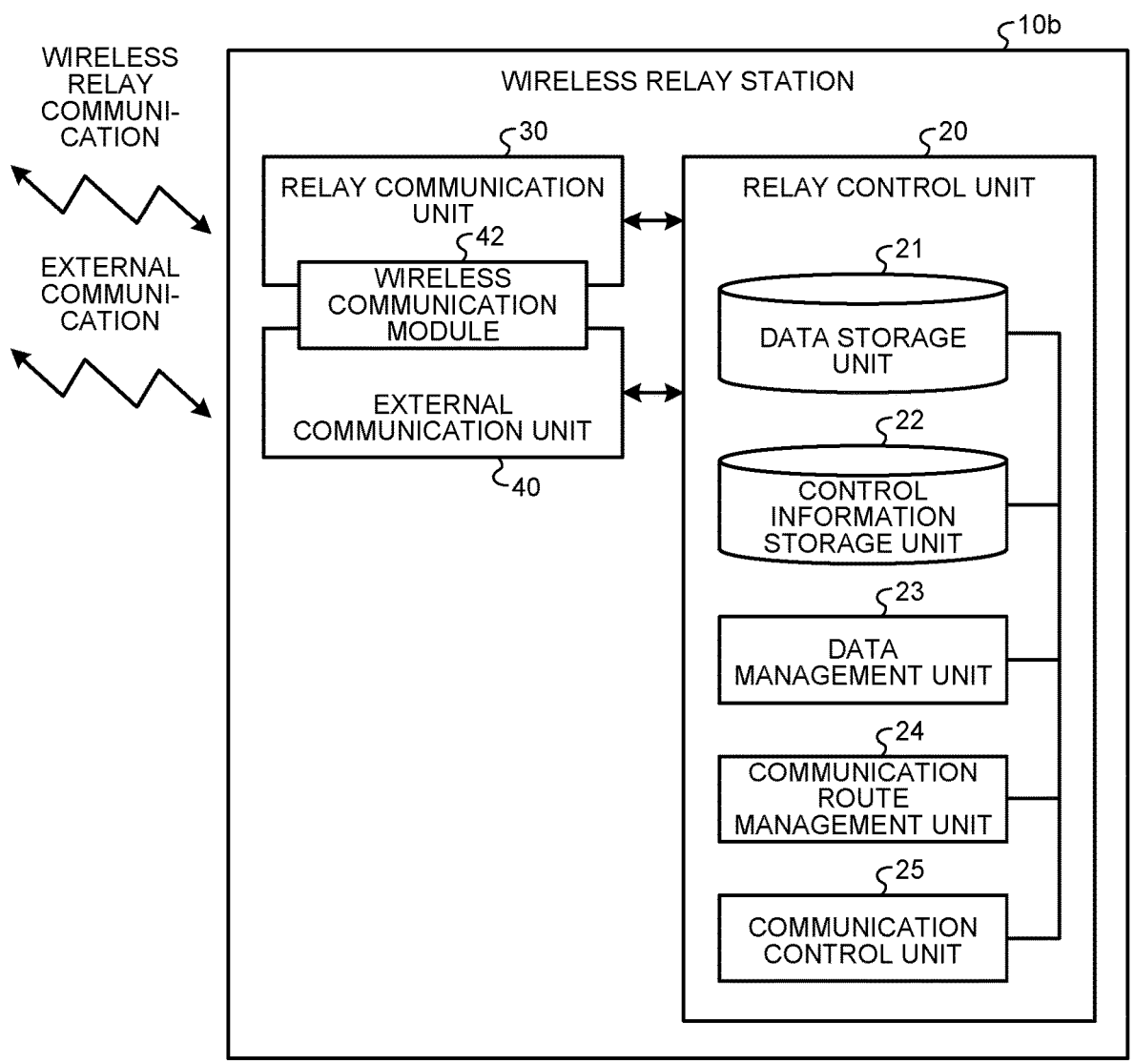
FIG. 13 is a second block diagram illustrating an example configuration of another wireless relay station according to the second embodiment.

Another configuration may be used in which the functionality of the wireless relay communication module 31 and the functionality of the external communication module 41 are implemented together in a signal communication module. FIG. 13 is a second block diagram illustrating an example configuration of a wireless relay station 10b according to the second embodiment. A wireless communication module 42 provides relay communication functionality and external communication functionality. The relay communication functionality of the wireless communication module 42 is managed by the relay communication unit 30, while the external communication functionality of the wireless communication module 42 is managed by the external communication unit 40.

Use of an external communication module 41 that is a wireless interface that supports cellular communication enables the wireless relay station 10a to communicate with a cellular base station. When a relay station is installed within the coverage of a cellular base station, that relay station is preferably configured similarly to the wireless relay station 10a. Similarly, use of a wireless communication module 42 that is a wireless interface that supports cellular communication enables the wireless relay station 10b to communicate with a cellular base station. When a relay station is installed within the coverage of a cellular base station, that relay station is preferably configured similarly to the wireless relay station 10b.

The wireless relay stations 10a and 10b each have a hardware configuration in which the external communication unit 40 is a communication device. The relay control unit 20 is implemented in processing circuitry. The processing circuitry may be a set of a processor that executes a program stored in a memory and the memory, or may be a dedicated hardware element.

As described above, according to the present embodiment, the wireless relay stations 10a and 10b perform data transmission to and from outside the wireless relay network. Also in this case, the wireless relay stations 10a and 10b can provide an advantage similar to that of the first embodiment.

Third Embodiment

In a third embodiment, the wireless relay station 10 of the first embodiment or the wireless relay station 10a or 10b of the second embodiment measures the received electric field strength during relay communication with neighboring relay stations and mobile station directly connected thereto, and stores measurement results in the second routing table. The following description will be provided using the wireless relay station 10 of the first embodiment as an example, but is also applicable to the wireless relay stations 10a and 10b of the second embodiment. The received electric field strength largely depends on the distance between a pair of the wireless relay stations 10 such that a smaller distance results in a higher value of the received electric field strength, and conversely, a larger distance results in a lower value. That is, the wireless relay station 10 can estimate the distance to the wireless relay stations 10 based on the received electric field strength, and can therefore estimate a relative location of a relay station and of a mobile station in the wireless relay network. The received electric field strength can generally be measured while the wireless relay station 10 performs communication, and can be obtained as a value of received signal strength indicator (RSSI), reference signal received power (RSRP), or the like.

FIG. 14 is a first diagram illustrating an example of the second routing table managed by the wireless relay station 10 according to the third embodiment. The second routing table illustrated in FIG. 14 further includes a received electric field strength for each station ID in addition to the information in the second routing table of the first embodiment illustrated in FIG. 6. The communication route management unit 24 of the wireless relay station 10 having an IP address of "192.168.0.100" and a station ID of "TF1000" observes a signal from each of the relay stations directly connected to that wireless relay station, and stores the received electric field strength obtained by measurement, in the second routing table. That is, the relay control unit 20 configures and updates the second routing table including a received electric field strength measurement value of the signal transmitted from each applicable one of the wireless relay stations 10 represented by a station ID thereof. Note that the received electric field strength is in fact measured by the wireless relay communication module 31, and the wireless relay communication module 31 outputs the measurement result of the received electric field strength to the communication route management unit 24. Note that values are omitted for the date (YY/MM/DD), no example values are displayed for the hour (hh), and specific values are thus displayed only for the minute and the second in the date and time display of the time stamp in FIG. 14.

FIG. 15 is a second diagram illustrating an example of the second routing table managed by the wireless relay station 10 according to the third embodiment. The second routing table illustrated in FIG. 15 further includes an estimated distance estimated by the communication route management unit 24 based on the received electric field strength in addition to the information in the second routing table illustrated in FIG. 14. That is, the relay control unit 20 configures and updates the second routing table including estimated distances, each of which is the inter-station distance measurement value representing the distance from the corresponding one of the wireless relay stations 10 represented by a station ID thereof. The distance can be estimated from the received electric field strength in various methods. One example is that, assuming that a pair of the wireless relay stations 10 directly connected to each other are located in line-of-sight, and considering that a radio wave attenuates in inverse proportion to the square of the distance, a distance d (in meters) between a pair of the wireless relay stations 10 can be calculated from a received electric field strength P (in dBm) by Equation (1) below.

[Formula 1]

$$d = \frac{\lambda}{4\pi} 10^{\frac{P_t+G_t+G_r-P}{20}} \quad (1)$$

In Equation (1), λ represents the wavelength (in meters) of the radio frequency used, Pt represents the aerial power (in dBm) on the transmitting side, Gt represents the transmission antenna gain (in dBi), and Gr represents the reception antenna gain (in dBi). As described above, the communication route management unit 24 may include an estimated distance in the second routing table in addition to the received electric field strength between a pair of the wireless relay stations 10, or each of the wireless relay stations 10 may estimate the distance between a pair of the wireless relay stations 10 without including the estimated distance.

As described above, according to the present embodiment, the wireless relay station 10 includes, in the second routing table shared among the wireless relay stations 10, the received electric field strength, or the received electric field strength and the estimated distance, from the relay stations and the mobile station directly connected thereto. This enables the wireless relay station 10 to estimate a relative location of a relay stations and of a mobile station in the wireless relay network, thereby enabling accuracy to be improved of the location relationship with each of the relay stations and the mobile stations to be understood. The wireless relay station 10 can thus derive a map equivalent to a set of relative kilometrages in the wireless relay network, thereby enabling the location of a mobile station, and even the location of a mobile station in a tunnel, to be estimated.

Fourth Embodiment

In a fourth embodiment, a wireless relay station includes a component for directly measuring the distance between wireless relay stations in addition to the components of each of the wireless relay stations 10, 10a, and 10b described in relation to the first embodiment through the third embodiment. Inclusion of functionality dedicated to distance measurement enables the wireless relay station to improve accuracy of estimation of the distance between wireless relay stations. The following description will be provided using the wireless relay station 10 of the first embodiment as an example, but is also applicable to the wireless relay stations 10*a* and 10*b* of the second embodiment and to the wireless relay stations of the third embodiment.

Figure 16:
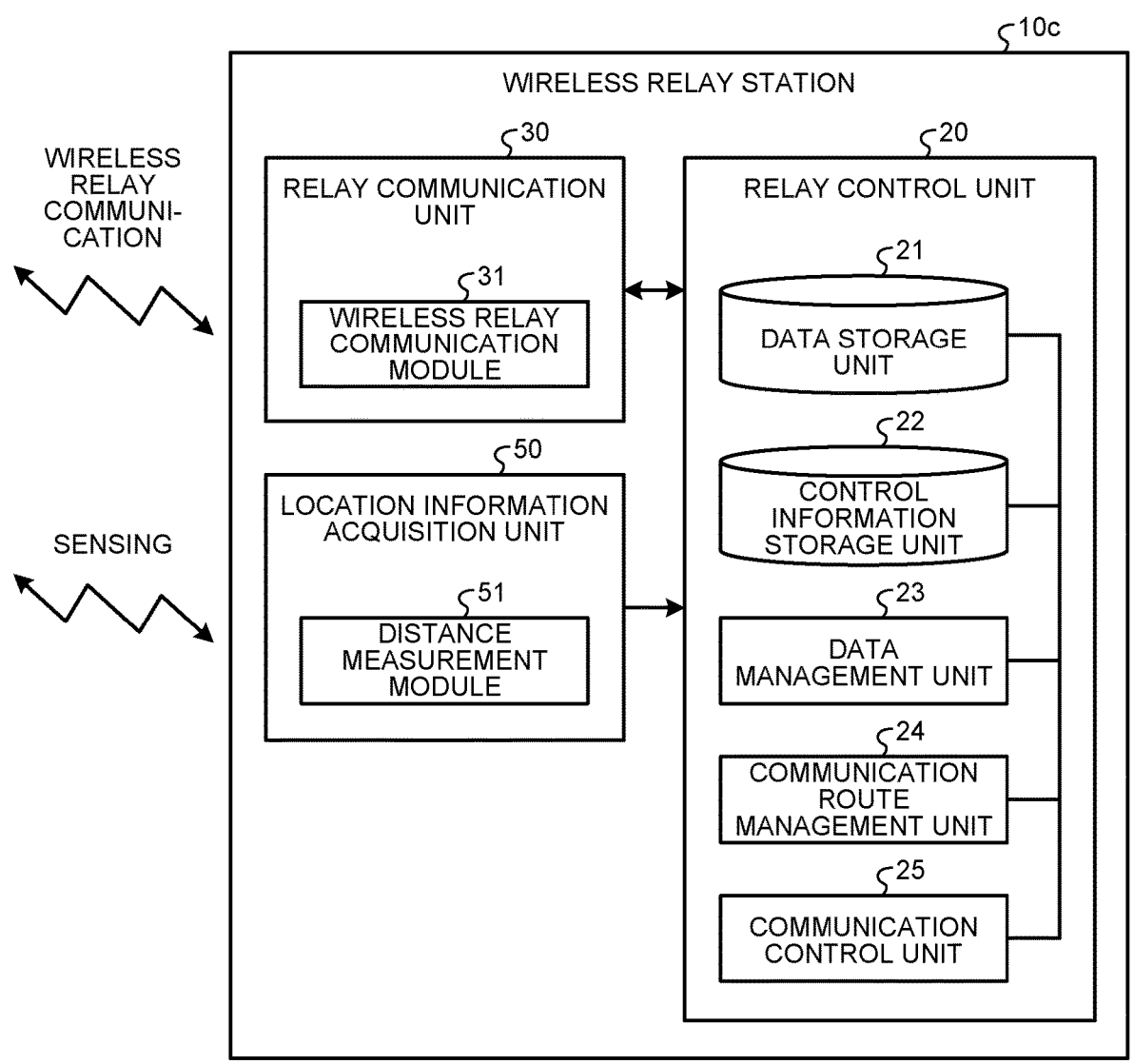
FIG. 16 is a first block diagram illustrating an example configuration of a wireless relay station according to a fourth embodiment.

FIG. 16 is a first block diagram illustrating an example configuration of a wireless relay station 10*c* according to the fourth embodiment. The wireless relay station 10*c* further includes a location information acquisition unit 50 in addition to the components of the wireless relay station 10 of the first embodiment illustrated in FIG. 3. The location information acquisition unit 50 includes a distance measurement module 51.

The distance measurement module 51 is a module that performs sensing, specifically, that is capable of measuring the distance to an object. The distance to an object can be measured using various distance measurement methods, and any method can be used that can measure the distance between a pair of the wireless relay stations 10*c*. Examples of the distance measurement method to be used by the distance measurement module 51 include a method using a laser beam, a method of estimation based on a camera-captured image, a method using a wide band wireless signal such as a millimeter wave or an ultra wide band (UWB), and a method using ultrasound.

In the fourth embodiment, the communication route management unit 24 of the relay control unit 20 configures and updates the second routing table including an inter-station distance measurement value representing the distance from the corresponding one of the wireless relay stations 10*c* represented by a station ID thereof, similarly to the operation in the third embodiment.

Figure 17:
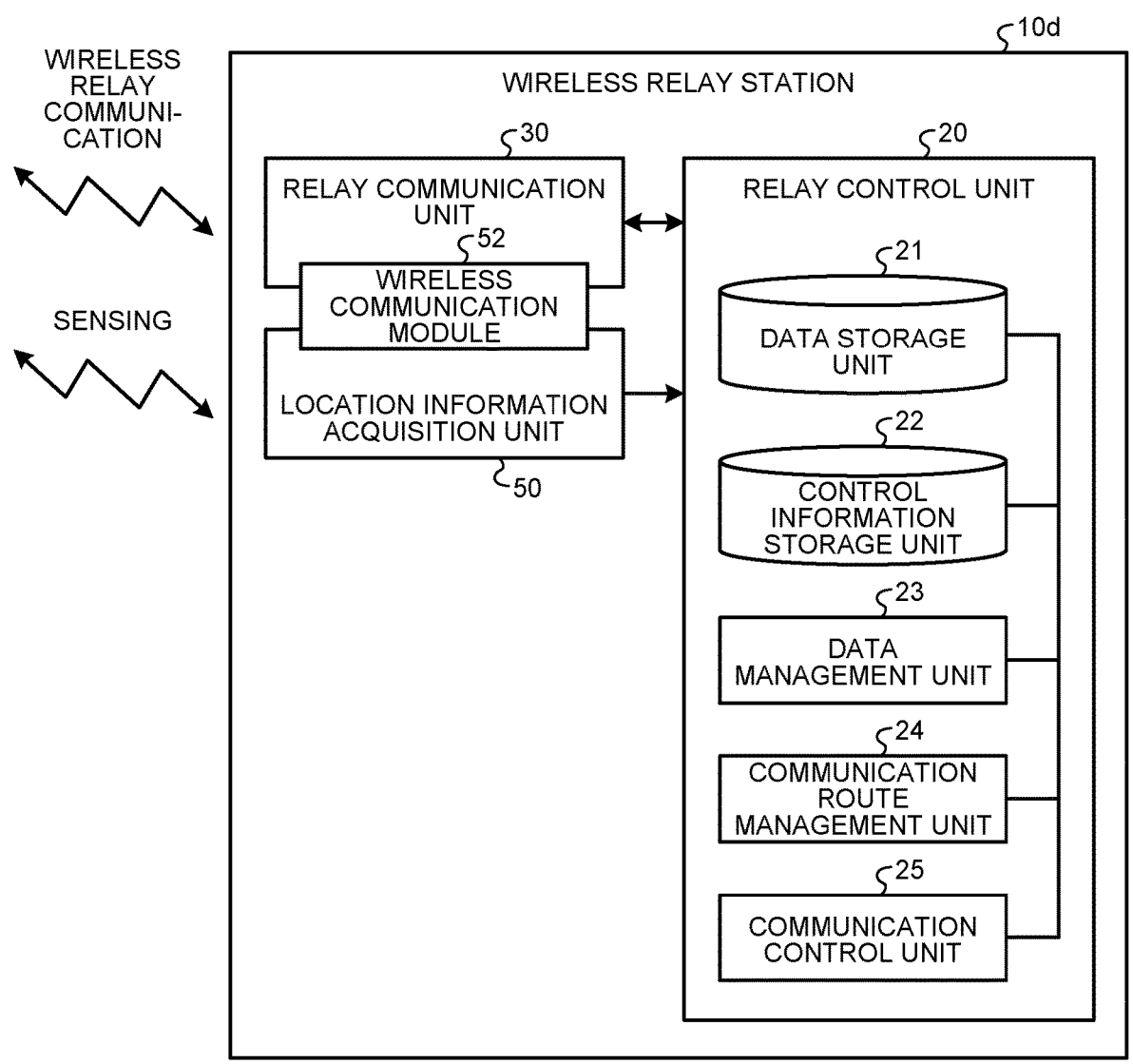
FIG. 17 is a second block diagram illustrating an example configuration of another wireless relay station according to the fourth embodiment.

In addition, 3GPP is discussing addition of distance measurement functionality to sidelink, and when sidelink having a distance measurement functionality is standardized, the relay communication functionality and the distance measurement functionality, for example, may be implemented together in a single wireless communication module 52 as in a wireless relay station 10*d* illustrated in FIG. 17. FIG. 17 is a second block diagram illustrating an example configuration of the wireless relay station 10*d* according to the fourth embodiment. The wireless communication module 52 provides the relay communication functionality and the distance measurement functionality. The relay communication functionality of the wireless communication module 52 is managed by the relay communication unit 30, while the distance measurement functionality of the wireless communication module 52 is managed by the location information acquisition unit 50.

As compared to the distance estimation method described in the third embodiment, the fourth embodiment uses dedicated distance measurement functionality to directly measure the distance, which generally improves accuracy of distance information. In this regard, in a case in which distance information is obtained in different manners depending on the relay station and on the mobile station, reliability of the distance information also depends on the relay station and on the mobile station. Thus, as illustrated in FIG. 18, the second routing table may additionally include a location accuracy metric value, which represents accuracy of distance information, in addition to the distance information. FIG. 18 is a diagram illustrating an example of the second routing table managed by the wireless relay stations 10*c* and 10*d* according to the fourth embodiment. In the example of FIG. 18, a lower location accuracy metric value indicates higher accuracy and higher reliability. The location accuracy metric value can be assigned in accordance with various rules. Example methods include assigning a large offset value when the distance is estimated from the received electric field strength as in the third embodiment, in contrast to when the distance is obtained using dedicated distance measurement functionality as in the fourth embodiment, in which a relatively low value is assigned when the estimated distance is short, when the received electric field strength is high, or in other similar cases, and otherwise, a relatively high value is assigned.

In the example of FIG. 18, such an offset value is 200, and a sum obtained by addition of a sign-inverted value of the received electric field strength is determined to be the location accuracy metric value. That is, in the second routing table illustrated in FIG. 18, the relay station #2 having a station ID of "TF0995" and the relay station #3 having a station ID of "TF1005" have their distances measured using the distance measurement functionality in the fourth embodiment, and therefore each have a low location accuracy metric value. Meanwhile, the relay station #1 having a station ID of "TF0990" and the relay station #4 having a station ID of "TF1010" have their distances estimated from the respective received electric field strengths, and therefore each have a high location accuracy metric value. As described above, the relay control unit 20 configures and updates the second routing table including a location accuracy metric value of each applicable one of the wireless relay stations 10*c* and 10*d* represented by a station ID thereof. The wireless relay stations 10*c* and 10*d* configure the second routing table to include an estimated distance as well as location estimation accuracy information, and share the second routing table among the wireless relay stations 10*c* and 10*d*. This enables the wireless relay stations 10*c* and 10*d* to, for example, extract high distance accuracy information, which is considered as reliable information, and discard low distance accuracy information, thus to update information in the second routing table received, thereby enabling the wireless relay stations 10*c* and 10*d* to be aware of, and share thereamong, higher accuracy relative locations.

Note that in a case of application to the second embodiment, the wireless relay stations 10*c* and 10*d* may each include the external communication unit 40. In addition, in the case of application to the second embodiment, the wireless relay stations 10*c* and 10*d* may each include a single wireless communication module capable of providing the relay communication functionality, the external communication functionality, and the distance measurement functionality.

The wireless relay stations 10*c* and 10*d* each have a hardware configuration in which the location information acquisition unit 50 is a sensor capable of measuring the distance to an object, or the like. The relay control unit 20 is implemented in processing circuitry. The processing circuitry may be a set of a processor that executes a program stored in a memory and the memory, or may be a dedicated hardware element.

As described above, according to the present embodiment, the wireless relay stations 10*c* and 10*d* each include a distance measurement result with respect to each station ID in the second routing table. This enables the wireless relay stations 10*c* and 10*d* to know the relative location with higher accuracy than when the distance is estimated only from the received electric field strength in the third embodiment. The wireless relay station 10 can thus derive a map equivalent to a set of relative kilometrage in the wireless relay network, thereby enabling the location of a mobile station, and even the location of a mobile station in a tunnel, to be estimated.

Fifth Embodiment

In a fifth embodiment, a wireless relay station includes a component for obtaining absolute location information of that wireless relay station in addition to the components of each of the wireless relay stations described in relation to the third embodiment or the fourth embodiment. If any one of the relay stations in the wireless relay network can detect an absolute location with high accuracy, a wireless relay station can improve the location estimation accuracy of other relay stations and thus more accurately know the traveling position of the mobile station.

Figure 19:
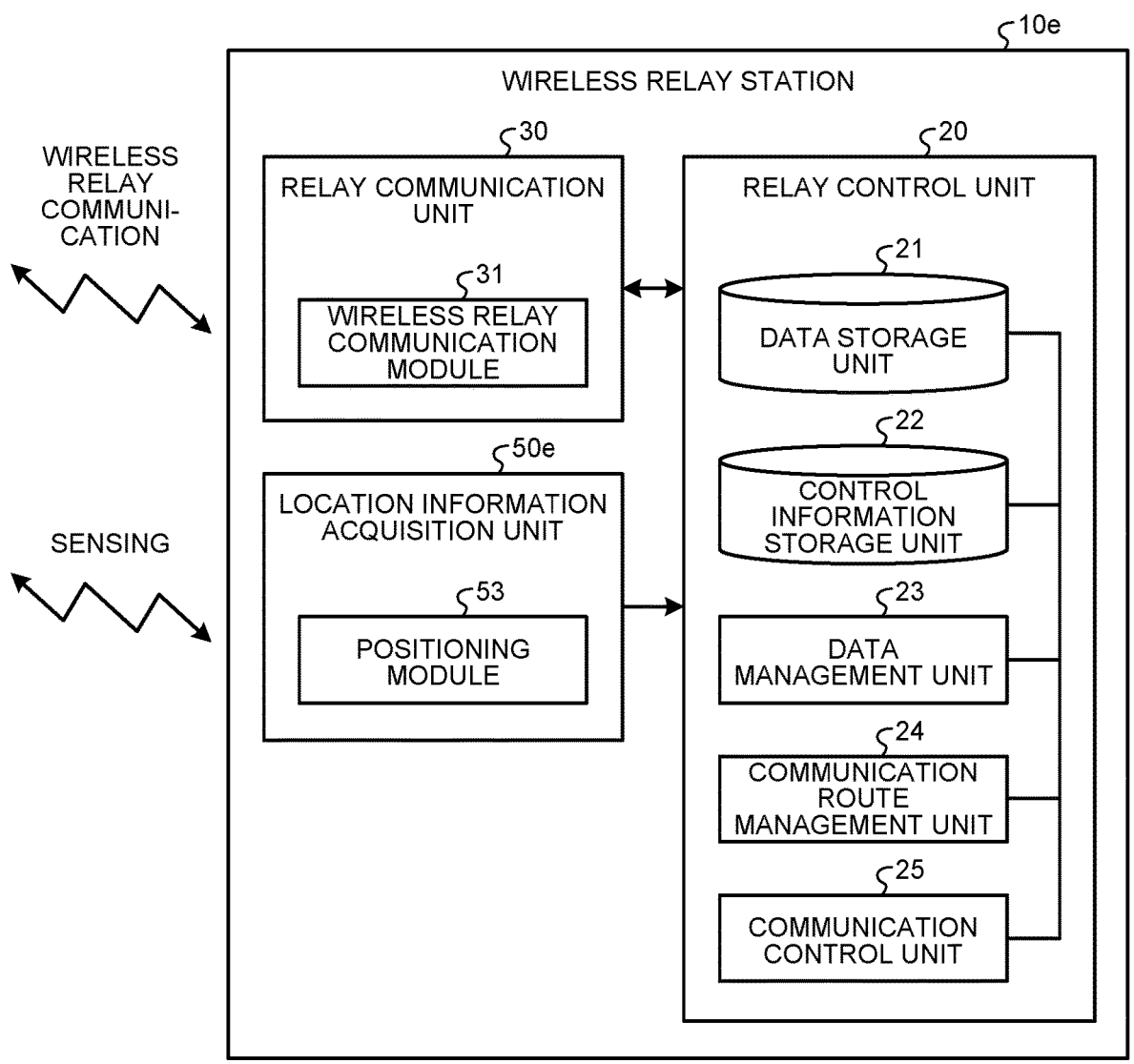
FIG. 19 is a first block diagram illustrating an example configuration of a wireless relay station according to a fifth embodiment.

FIG. 19 is a first block diagram illustrating an example configuration of a wireless relay station 10e according to the fifth embodiment. The wireless relay station 10e includes a location information acquisition unit 50e in place of the location information acquisition unit 50 of the wireless relay station 10c of the fourth embodiment illustrated in FIG. 16. The location information acquisition unit 50e includes a positioning module 53.

The positioning module 53 is a module that performs sensing, specifically, that provides functionality to obtain the absolute location information of the corresponding wireless relay station. As used herein, the term absolute location information refers to a metric marked on the ground to represent the location; for example, longitude and latitude information, which includes kilometrage information in the case of railroad. The positioning module 53 is implemented differently depending on absolute location information to be obtained. The positioning module 53 needs to include a reception module designed for a satellite positioning system, a typical example of which is a global navigation satellite system (GNSS), to obtain longitude and latitude information. Otherwise, the positioning module 53 needs to receive a signal from a device having kilometrage information installed on a railroad track, called ground coil, to obtain kilometrage information. However, the positioning module 53 is not limited thereto, but needs only to obtain absolute location information. The positioning module 53 may be, for example, one that provides functionality to obtain location information that has been assigned to the relay station upon installation of that relay station.

FIG. 20 is a diagram illustrating an example of the second routing table managed by the wireless relay station 10e according to the fifth embodiment. The second routing table illustrated in FIG. 20 further includes positioning information in addition to the information in the second routing table of the fourth embodiment illustrated in FIG. 18. The communication route management unit 24 of the wireless relay station 10e additionally stores positioning information in the second routing table of the fourth embodiment illustrated in FIG. 18. That is, the relay control unit 20 configures and updates the second routing table including the positioning information representing the location of the corresponding one of the wireless relay stations 10e represented by a station ID thereof. The example of FIG. 20 uses longitude and latitude information as the positioning information, but provides no specific example values for the longitude and latitude. Instead, the positioning information of the local station is shown as <lng, lat>, where in FIG. 20, "lng" represents longitude, and "lat" represents latitude.

When the longitude and latitude is obtained through the positioning module 53, the wireless relay station 10e can obtain the location information with higher accuracy than when using distance measurement, and the location information serves as the basis for detecting a location in the wireless relay network. Accordingly, the location accuracy metric value is set to, for example, 1 for that wireless relay station. This enables the wireless relay stations 10e to preferentially use the location information of the wireless relay station 10e having positioning information during sharing of the second routing table among the wireless relay stations 10e, and thus enables the locations of the wireless relay stations 10e in the wireless relay network to be known with higher accuracy. In the wireless relay station 10e, the relay control unit 20 configures and updates the second routing table including a location accuracy metric value of the wireless relay stations 10e represented by station IDs thereof.

Figure 21:
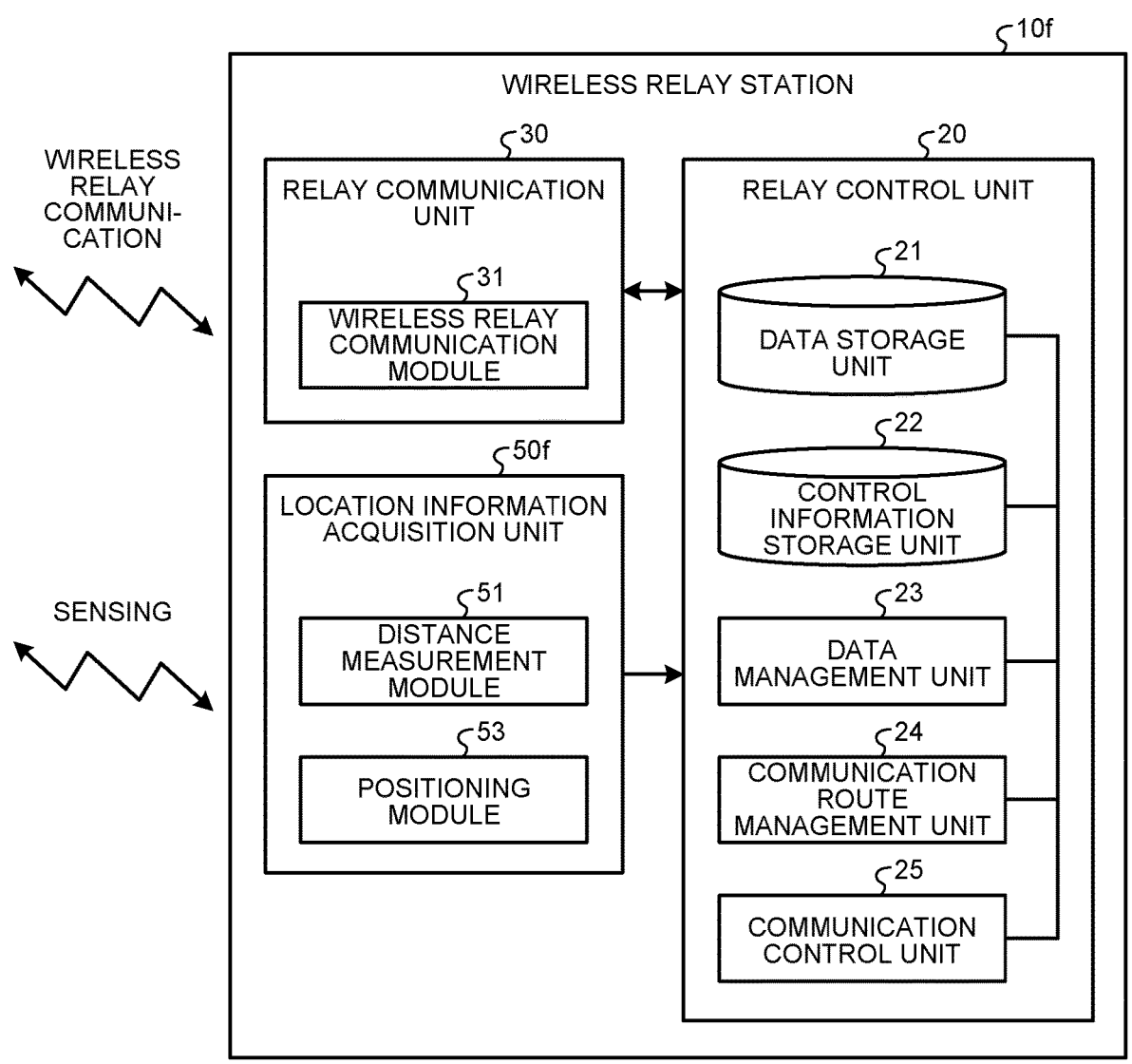
FIG. 21 is a second block diagram illustrating an example configuration of another wireless relay station according to the fifth embodiment.

Note that the wireless relay station 10e illustrated in FIG. 19 is configured not to include the distance measurement module 51, but its configuration is not limited thereto, and a location information acquisition unit 50f may include the distance measurement module 51 as in a wireless relay station 10f illustrated in FIG. 21. FIG. 21 is a second block diagram illustrating an example configuration of the wireless relay station 10f according to the fifth embodiment. The wireless relay station 10f includes the location information acquisition unit 50f in place of the location information acquisition unit 50e of the wireless relay station 10e of the fifth embodiment illustrated in FIG. 19. The location information acquisition unit 50f includes the distance measurement module 51 and the positioning module 53. The distance measurement module 51 is configured similarly to the distance measurement module 51 described above.

The wireless relay stations 10e and 10f each have a hardware configuration in which the location information acquisition unit 50e or 50f is a sensor for obtaining the absolute location information of that wireless relay station, or the like. The relay control unit 20 is implemented in processing circuitry. The processing circuitry may be a set of a processor that executes a program stored in a memory and the memory, or may be a dedicated hardware element.

As described above, according to the present embodiment, the wireless relay stations 10e and 10f obtain absolute location information of that wireless relay station. This enables the wireless relay stations 10e and 10f to preferentially use the location information of the wireless relay stations 10e and 10f having positioning information, and thus to know the location of each of the wireless relay stations 10e and 10f in the wireless relay network with higher accuracy.

Sixth Embodiment

In a sixth embodiment, a wireless relay station includes various interface components for IoT communication for collecting information from a sensor, a surveillance camera, and/or the like located near that wireless relay station and for transferring the information to other relay stations and mobile stations by wireless relay communication, in addition to the components of any one of the wireless relay stations described in relation to the first embodiment thought the fifth embodiment. Note that the following description will be provided with respect to a case of application to the wireless relay station 10 of the first embodiment, but is also applicable to the wireless relay stations of the second embodiment through the fifth embodiment.

Figure 22:
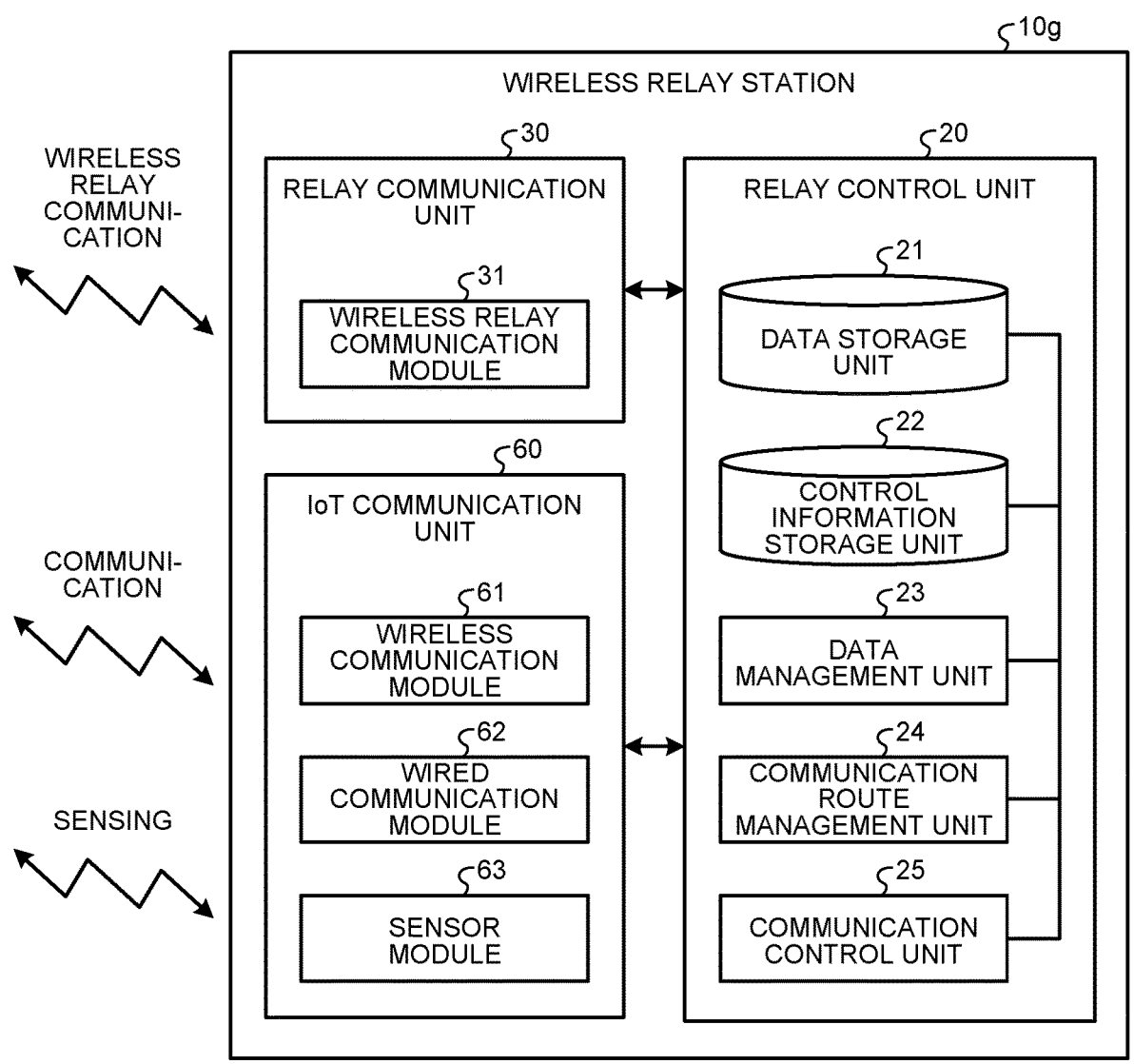
FIG. 22 is a block diagram illustrating an example configuration of a wireless relay station according to a sixth embodiment.

FIG. 22 is a block diagram illustrating an example configuration of a wireless relay station 10g according to the sixth embodiment. The wireless relay station 10g further includes an IoT communication unit 60 in addition to the components of the wireless relay station 10 of the first embodiment illustrated in FIG. 3. The IoT communication unit 60 has communication capability, sensing capability, and the like different from those of the relay communication unit 30 and of the external communication unit 40. The IoT communication unit 60 collects information representing environmental conditions around the corresponding wireless relay station. The IoT communication unit 60 includes, by way of example, a wireless communication module 61, a wired communication module 62, and a sensor module 63. Note that the IoT communication unit 60 is not limited to the one in the example of FIG. 22, but may include multiple ones of each of those modules. Alternatively, the IoT communication unit 60 may be configured to include one of those modules or any two of those modules. The IoT communication unit 60 includes at least one of the wireless communication module 61, the wired communication module 62, or the sensor module 63. Transmission and reception data in relation to the IoT communication unit 60 is managed by the data management unit 23, and stored in the data storage unit 21. Communication with respect to the IoT communication unit 60 is controlled by the communication control unit 25.

For example, the wireless communication module 61 and the wired communication module 62 each collect sensor information from a sensor, and collect image information from a surveillance camera, located near the corresponding wireless relay station. Examples of wireless interface for use in information collection by the wireless communication module 61 include, but not limited to, Bluetooth (registered trademark) and a wireless LAN. Examples of wired interface for use in information collection by the wired communication module 62 include, but not limited to, universal serial bus (USB), a wired LAN defined in IEEE 802.3, and High-Definition Multimedia Interface (HDMI) (registered trademark).

The sensor module 63 is a module that observes an environmental condition, a device condition, and the like of the corresponding wireless relay station or around the corresponding wireless relay station. The sensor module 63 is a module that observes or detects, for example, but not limited to, the temperature, the humidity, the atmospheric pressure, the wind direction, the rainfall, the snowfall, and/or vibration.

Note that the wireless relay station 10g does not include the external communication unit 40, but its configuration is not limited thereto, and the wireless relay station 10g may include the external communication unit 40, capable of communicating with a cellular base station and/or the like as described in relation to the second embodiment. In addition, the wireless relay station 10g includes none of the location information acquisition units 50, 50e, and 50f, but its configuration is not limited thereto, and the wireless relay station 10g may include the location information acquisition unit 50, 50e, or 50f as described in relation to the fourth or fifth embodiment.

The wireless relay station 10g has a hardware configuration in which the wireless communication module 61 and the wired communication module 62 of the IoT communication unit 60 are each a communication device. The sensor module 63 of the IoT communication unit 60 is a measuring instrument. The relay control unit 20 is implemented in processing circuitry. The processing circuitry may be a set of a processor that executes a program stored in a memory and the memory, or may be a dedicated hardware element.

As described above, according to the present embodiment, the wireless relay station 10g includes the IoT communication unit 60, and aggregates information such as a monitoring image from a nearby sensor, surveillance camera, or the like, and transmits the information to other relay stations and mobile stations by the relay communication unit 30. That is, the wireless relay station 10g serves as an information and communication hub. This enables other relay stations and mobile stations located at distant locations to remotely know the environment near the wireless relay station 10g that has transmitted the information.

A wireless relay station according to the present disclosure provides an advantage in being capable of reducing or preventing a reduction in wireless communication quality in a wireless relay network including a moving wireless relay station.

The configurations described in the foregoing embodiments are merely examples. These configurations may be combined with a known other technology, and configurations of different embodiments may be combined together. Moreover, a part of the configurations may be omitted and/or modified without departing from the spirit thereof.

What is claimed is:

1. A wireless relay station to be included in a ladder-type wireless relay network along a moving route of a moving object, the wireless relay station comprising:
   a relay controller to include station identification information in the wireless relay network that is assigned sequentially along the moving route to each of wireless relay stations included in the wireless relay network and deployed along the moving route, to configure and update, using a first routing table that provides an address of a destination wireless relay station, a second routing table including the address, the station identification information, and an information update time, being associated with one another, of the destination wireless relay station, and to provide control to share, among the wireless relay stations included in the wireless relay network, the second routing table configured and updated by each of the wireless relay stations; and
   a relay communicator to perform wireless relay communication with another one of the wireless relay stations.

2. The wireless relay station according to claim 1, wherein the relay communicator comprises a wireless relay communication module having a wireless interface that supports sidelink standardized in Third Generation Partnership Project.

3. The wireless relay station according to claim 1, comprising:
   an external communicator to perform wireless communication different from the wireless relay communication.

4. The wireless relay station according to claim 3, wherein the external communicator comprises an external communication module having a wireless interface that supports Long Term Evolution standardized in Third Generation Partnership Project.

5. The wireless relay station according to claim 3, wherein the external communicator comprises an external communication module having a wireless interface that supports Fifth Generation New Radio standardized in Third Generation Partnership Project.

6. The wireless relay station according to claim 1, wherein the relay controller configures and updates the second routing table including a received electric field strength measurement value of a signal transmitted from a wireless relay station represented by the station identification information.

7. The wireless relay station according to claim 1, wherein the relay controller configures and updates the second routing table including an inter-station distance measurement value representing a distance from a wireless relay station represented by the station identification information.

8. The wireless relay station according to claim 1, wherein the relay controller configures and updates the second routing table including positioning information representing a location of a wireless relay station represented by the station identification information.

9. The wireless relay station according to claim 7, wherein the relay controller configures and updates the second routing table including a location accuracy metric value of a wireless relay station represented by the station identification information.

10. The wireless relay station according to claim 8, wherein
the relay controller configures and updates the second routing table including a location accuracy metric value of a wireless relay station represented by the station identification information.

11. The wireless relay station according to claim 1, comprising:
an Internet of Things communicator to collect information representing an environmental condition around the wireless relay station.

12. The wireless relay station according to claim 11, wherein
the Internet of Things communicator comprises at least one of a wireless communication module, a wired communication module, or a sensor module.

13. The wireless relay station according to claim 1, wherein the wireless relay station is immobile.

14. The wireless relay station according to claim 1, wherein the wireless relay station moves on the moving route.

15. A wireless relay system comprising two or more of the wireless relay station according to claim 1.

16. A control circuit for controlling a wireless relay station to be included in a ladder-type wireless relay network along a moving route of a moving object, the control circuit causing the wireless relay station to:
include station identification information in the wireless relay network that is assigned sequentially along the moving route to each of wireless relay stations included in the wireless relay network and deployed along the moving route, configure and update, using a first routing table that provides an address of a destination wireless relay station, a second routing table including the address, the station identification information, and an information update time, being associated with one another, of the destination wireless relay station, and provide control to share, among the wireless relay stations included in the wireless relay network, the second routing table configured and updated by each of the wireless relay stations; and
perform wireless relay communication with another one of the wireless relay stations.

17. A non-transitory storage medium storing a program for controlling a wireless relay station to be included in a ladder-type wireless relay network along a moving route of a moving object, wherein
the program causes the wireless relay station to
include station identification information in the wireless relay network that is assigned sequentially along the moving route to each of wireless relay stations included in the wireless relay network and deployed along the moving route, configure and update, using a first routing table that provides an address of a destination wireless relay station, a second routing table including the address, the station identification information, and an information update time, being associated with one another, of the destination wireless relay station, and provide control to share, among the wireless relay stations included in the wireless relay network, the second routing table configured and updated by each of the wireless relay stations, and
perform wireless relay communication with another one of the wireless relay stations.

18. A wireless relay method for a wireless relay station to be included in a ladder-type wireless relay network along a moving route of a moving object, the wireless relay method comprising:
including station identification information in the wireless relay network that is assigned sequentially along the moving route to each of wireless relay stations included in the wireless relay network and deployed along the moving route, configuring and updating, by using a first routing table that provides an address of a destination wireless relay station, a second routing table including the address, the station identification information, and an information update time, being associated with one another, of the destination wireless relay station, and providing control to share, among the wireless relay stations included in the wireless relay network, the second routing table configured and updated by each of the wireless relay stations; and
performing wireless relay communication with another one of the wireless relay stations.

* * * * *